(12) United States Patent
Ogihara et al.

(10) Patent No.: US 11,128,004 B2
(45) Date of Patent: Sep. 21, 2021

(54) EXTERIOR MATERIAL FOR LITHIUM ION BATTERY

(71) Applicant: TOPPAN PRINTING CO., LTD., Tokyo (JP)

(72) Inventors: Yu Ogihara, Tokyo (JP); Junya Imamoto, Tokyo (JP); Masayoshi Suzuta, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/921,298

(22) Filed: Mar. 14, 2018

(65) Prior Publication Data

US 2018/0205047 A1    Jul. 19, 2018

Related U.S. Application Data

(63) Continuation of application No. PCT/JP2016/077331, filed on Sep. 15, 2016.

(30) Foreign Application Priority Data

Sep. 17, 2015  (JP) .............................. JP2015-184232
Sep. 17, 2015  (JP) .............................. JP2015-184233

(51) Int. Cl.
*H01M 50/183* (2021.01)
*H01M 50/116* (2021.01)
(Continued)

(52) U.S. Cl.
CPC ....... *H01M 50/183* (2021.01); *H01M 50/116* (2021.01); *H01M 50/124* (2021.01); *H01M 10/052* (2013.01); *H01M 10/0525* (2013.01)

(58) Field of Classification Search
CPC .... H01M 2/08; H01M 2/0277; H01M 2/0287; H01M 10/052; H01M 10/0525
See application file for complete search history.

(56) References Cited

U.S. PATENT DOCUMENTS 4,472,555 A * 9/1984 Schmukler ......... C09J 123/0815
                                                      525/74
4,567,121 A * 1/1986 Gilmour ............. H01M 2/0404
                                                      429/181
(Continued)

FOREIGN PATENT DOCUMENTS

JP  59-083340 A  5/1984
JP  S5983340 A * 5/1984 .............. H01M 2/08
(Continued)

OTHER PUBLICATIONS

Kobayashi—JP S59-83440 A—ISR D#6—MT—flat battery—1984 (Year: 1984).*
(Continued)

*Primary Examiner* — Callie E Shosho
*Assistant Examiner* — John Vincent Lawler
(74) *Attorney, Agent, or Firm* — Foley & Lardner LLP

(57) ABSTRACT

An exterior material for a lithium ion battery comprising at least a substrate layer, a metal foil layer, and a sealant layer in that order, wherein the sealant layer comprises an anionic functional group-containing layer containing a compound having an anionic functional group, and the concentration of the anionic functional group contained in the anionic functional group-containing layer is about 1.0 mass % or more based on the total amount of the components constituting the anionic functional group-containing layer.

11 Claims, 6 Drawing Sheets

(51) Int. Cl.
*H01M 50/124* (2021.01)
*H01M 10/052* (2010.01)
*H01M 10/0525* (2010.01)

(56) References Cited

U.S. PATENT DOCUMENTS

| | | | | |
|---|---|---|---|---|
| 7,285,334 B1 * | 10/2007 | Yamashita | .......... | H01M 2/0267 428/220 |
| 7,358,007 B1 * | 4/2008 | Sawada | ............ | H01M 2/0257 427/409 |
| 2010/0015451 A1 * | 1/2010 | Suzuta | ................ | B32B 15/08 428/424.8 |
| 2010/0173168 A1 * | 7/2010 | Yasui | ................ | C08L 51/06 428/516 |
| 2013/0011669 A1 * | 1/2013 | Lu | ................ | C08L 23/14 428/349 |
| 2014/0072864 A1 * | 3/2014 | Suzuta | ................ | B32B 15/08 429/176 |

FOREIGN PATENT DOCUMENTS

| | | | | | |
|---|---|---|---|---|---|
| JP | 09-190835 A | | 7/1997 | | |
| JP | H09190835 A | * | 7/1997 | ............ | H01M 10/12 |
| JP | 2002-245982 A | | 8/2002 | | |
| JP | 2002-245983 A | | 8/2002 | | |
| JP | 2002-319376 A | | 10/2002 | | |
| JP | 2002-362617 A | | 12/2002 | | |
| JP | 2002362617 A | * | 12/2002 | ............ | B32B 15/08 |
| JP | 2003-062932 A | | 3/2003 | | |
| JP | 2003062932 A | * | 3/2003 | ............ | B32B 15/08 |
| JP | 2004-142302 A | | 5/2004 | | |
| JP | 2004142302 A | * | 5/2004 | ............ | B32B 15/08 |
| JP | 2004-311228 A | | 11/2004 | | |
| JP | 2004311228 A | * | 11/2004 | ............ | H01M 2/02 |
| JP | 2008-210777 A | | 9/2008 | | |
| JP | 2010-212070 A | | 9/2010 | | |
| JP | 2010212070 A | * | 9/2010 | ............ | H01M 2/02 |
| JP | 2013-206878 A | | 10/2013 | | |
| JP | 2014-026778 A | | 2/2014 | | |
| JP | 2014026778 A | * | 2/2014 | ............ | H01M 2/02 |

OTHER PUBLICATIONS

Yonezu—JP H09-190835 A—ISR D#5—MT—lead-acid battery—1997 (Year: 1997).*
Suzuta—JP 2002-362617 A—ISR D#8—MT—multi-layer package—2002 (Year: 2002).*
Ohashi—JP 2003-062932 A—ISR D#9—MT—laminate & packaging material—2003 (Year: 2003).*
Kobayashi—JP 2004-311228 A—ISR#1—MT—Sheath material for Li-Ion Batt—2004 (Year: 2004).*
Ohashi—JP 2004-142302 A—ISR D#7—MT—laminated packaging material—2004 (Year: 2004).*
Anada—JP 2010-212070 A—ISR D#3—MT—battery—2010 (Year: 2010).*
Morikoshi—JP 2014-026778 A—ISR D#4—MT—laminate film for battery—2014 (Year: 2014).*
Nuc_m_p21_h1—ISR D#2—Original table+translation (Year: 2019).*
SK Global Chemical Primacor™ 3340 Ethylene Acrylic Acid Copolymer (Year: 2020).*
Kalista—Self-healing ionomers—Section+Book info—2009 (Year: 2009).*
International Search Report Issued in International Patent Application No. PCT/JP2016/077331 dated Dec. 6, 2016.

* cited by examiner

SOLUTION INJECTION

25V APPLICATION

EXTERIOR MATERIAL FOR LITHIUM ION BATTERY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/077331, filed on Sep. 15, 2016, which is based upon and claims the benefit of priority to Japan Priority Application No. 2015-184233, filed on Sep. 17, 2015 and Japan Priority Application No. 2015-184232, filed on Sep. 17, 2015, the disclosures of which are all hereby incorporated herein by reference in their entireties.

TECHNICAL FIELD

The present invention relates to an exterior material for a lithium ion battery.

BACKGROUND

Metal cans that have been used for exterior materials for lithium ion batteries are being replaced by multilayer films (for example, a configuration such as a substrate layer/a metal foil layer/a sealant layer) due to their light weight, high heat dissipation, and low manufacturing cost of the lithium ion battery. As the lithium ion battery adopting such a configuration, for example, an embossed lithium ion battery in which a recess is formed in part of the exterior material by cold forming to accommodate the battery contents within the recess, and the remaining part of the exterior material is folded to seal the edge portion by heat sealing is known.

Recently, as electronic devices such as smartphones and tablet PCs become thinner and larger, batteries mounted in electronic devices are required to be thinner and have a larger capacity. From the viewpoints of an increase of the battery capacity and cost reduction, exterior materials for batteries are required to be thin and making the inner layer which is an insulator thinner is also required.

However, if the inner layer is made thinner, there are the problems that fine cracks occur easily in the sealant layer due to stress during cold molding. The electrolytic solution can penetrate into the cracks and the insulation property can more easily deteriorate after molding.

Techniques for improving the insulation properties and durability of the sealant layer have been examined. For example, for the purpose of preventing a short circuit between a barrier layer of the outer packaging body and a tab due to the heat and the pressure of the heat sealing, a heat sealant layer including an adhesive polymethylpentene layer, a heat sealant layer including an electron beam cross-linked polyolefin layer, and a multilayer sealant layer and the like subjected to a predetermined crosslinking treatment by co-extrusion and film forming polyolefin with an acid-modified polyolefin have been proposed (refer to, for example, the following PTL 1 to 3). Further, for suppressing a short circuit due to heat sealing and suppressing the generation of cracks, a sealant layer including a cycloolefin copolymer consisting of a copolymer of ethylene and norbornene has been proposed (for example, refer to the following PTL 4).

Citation List; Patent Literature: PTL 1: JP-A 2002-245983; PTL 2: JP-A 2002-245982; PTL 3: JP-A 2002-319376; PTL 4: JP-A 2013-206878

SUMMARY OF THE INVENTION

Technical Problem

The sealant layer used with the exterior material for the lithium ion battery is susceptible to defects due to repeated deformation associated with volume changes such as swelling of the electrolytic solution, crystallization, and orienting during the heat sealing and molding of the battery manufacturing process. However, in PTL 1 to 4, while suppressing the occurrence of defects in the sealant layer has been studied, countermeasures against defects that have occurred have not been studied. According to the examination of the present inventors, an exterior material comprising the sealant layer of the conventional technology was discovered in which the resistance value is decreased in the case when the insulation properties during cold molding and after molding with heat sealing were evaluated.

The present invention was made taking the problems of the conventional technology into consideration, and the purpose of the present invention is to provide an exterior material for the lithium ion battery which can sufficiently maintain the insulation properties after molding.

Solution to Problem

The present inventors performed keen research in order to solve the problems, and as a result, discovered that an exterior material comprising a sealant layer having a resin, and a compound having a functional group which can capture lithium ions and blended so as to have a predetermined functional group concentration can more sufficiently suppress the reduction of the resistance value after molding. They completed the present invention based on this knowledge.

Namely, the present invention provides an exterior material for a lithium ion battery comprising at least a substrate layer, a metal foil layer, and a sealant layer in that order, wherein the sealant layer comprises an anionic functional group-containing layer containing a compound having an anionic functional group, and the concentration of the anionic functional group contained in the anionic functional group-containing layer is about 1.0 mass % or more based on the total amount of the components constituting the anionic functional group-containing layer.

According to the exterior material for the lithium ion battery of the present invention, the insulation properties after molding can be sufficiently maintained by comprising a sealant layer containing the aforementioned anionic functional group-containing layer. As the reason that such an effect can be obtained, the present inventors considered that the sealant layer containing the aforementioned anionic functional group-containing layer can suppress the reduction of the resistance value due to the anionic functional group present at a predetermined concentration capturing the lithium ions that enter the defects so as to stop the unnecessary flow (for example, the lithium ions can come into contact with and conduct with the metal foil layer) of electrons, when fine defects occurred in the battery manufacturing process. Note that, the previously mentioned defects are presumed to be (1) cracks due to molding and orientation, (2) thinning due to heat sealing and microcracks due to resin accumulation and crystallization, (3) destructive swelling and the like.

In the exterior material for the aforementioned lithium ion battery, the aforementioned anionic functional group preferably contains at least one of a carboxyl group and an acid anhydride group.

In the exterior material for the aforementioned lithium ion battery, a compound having the aforementioned anionic functional group preferably contains at least one compound selected from the group consisting of fatty acids, ethylenediaminetetraacetic acid (EDTA), ethylene-methacrylic acid copolymer and maleic anhydride copolymer.

In the exterior material for the aforementioned lithium ion battery, the aforementioned sealant layer is composed of a plurality of layers, and at least one layer thereamong may contain the aforementioned anionic functional group-containing layer.

Further, at least one layer other than the layer (also referred to as the "innermost layer of the sealant layer") farthest from the metal layer among the aforementioned plurality of layers is preferably the aforementioned anionic functional group-containing layer. When the compound having the anionic functional group has a low compatibility with the polypropylene-based resin, if a compound having the anionic functional group is formulated on the innermost layer of the sealant layer, cracks and blushing tend to occur during molding. Further, since the innermost layer of the sealant layer is susceptible to the cohesive force of the seal, it tends to be more difficult to secure the burst strength of the seal. Furthermore, if a compound having an anionic functional group is present on the innermost layer of the sealant layer, there is the possibility that the lithium ions contained in the electrolytic solution may be captured and the battery performance is decreased. By providing the anionic functional group-containing layer other than as the innermost layer of the sealant layer, the insulation properties after molding can be sufficiently maintained while solving the aforementioned concern.

The layer farthest from the metal foil layer among the aforementioned plurality of layers is preferably the layer comprising a propylene-ethylene random copolymer, or a layer comprising the propylene-ethylene random copolymer and a compatible elastomer having compatibility with the propylene-ethylene random copolymer.

The aforementioned exterior material for the lithium ion battery further comprises an adhesive resin layer between the aforementioned metal foil layer and the aforementioned sealant layer, wherein the adhesive resin layer may comprise an adhesive resin composition, and a polypropylene having an atactic structure or a propylene-α-olefin copolymer having an atactic structure. In this case, blushing due to molding can be alleviated.

In the aforementioned exterior material for the lithium ion battery, the aforementioned sealant layer may contain a polyethylene-based resin.

When the aforementioned sealant layer contains the polyethylene-based resin, the aforementioned anionic functional group-containing layer preferably contains an ethylene-α-olefin copolymer. In this case, it is easy to secure the sealing strength, and cracks are less likely to occur.

When the aforementioned sealant layer contains the polyethylene-based resin, the aforementioned sealant layer is composed of a plurality of layers, and the layer furthest from the metal foil layer thereamong preferably contains the ethylene-α-olefin copolymer. In this case, it is easy to secure the sealing strength, cracks are less likely to occur, and the reduction of the battery performance due to a compound having the aforementioned anionic functional group can also be prevented.

The density of the aforementioned ethylene-α-olefin copolymer is preferably 0.925 to 0.945 g/cm$^3$. In this case, it becomes easy to achieve both heat resistance of the sealant layer and securing of the sealing strength.

The aforementioned exterior material for the lithium ion battery may further comprise, when the aforementioned sealant layer contains the polyethylene-based resin, an adhesive resin layer between the aforementioned metal foil layer and the aforementioned sealant layer, wherein the adhesive resin layer may contain an acid-modified polyethylene resin.

The aforementioned exterior material for the lithium ion battery may further comprise the adhesive layer between the aforementioned metal foil layer and the aforementioned sealant layer, wherein the adhesive layer may contain the acid-modified polyolefin, and at least one type of curing agent selected from the group consisting of a polyfunctional isocyanate compound, a glycidyl compound, a compound having a carboxyl group and a compound having an oxazoline group. In this case, the adhesion between the metal foil layer and the sealant layer can improve, delamination due to stress such as during cold molding and the occurrence of cracks due to the stress can be more effectively suppressed, and the reduction of the insulation properties after molding can be more effectively prevented.

The aforementioned exterior material for the lithium ion battery is characterized in that the aforementioned metal foil layer has a corrosion prevention treatment layer on one or both sides, and the corrosion prevention treatment layer may contain cerium oxide, 1 to 100 parts by mass of phosphoric acid or phosphate based on 100 parts by mass of the cerium oxide, and a cationic polymer. In this case, the adhesion between the metal layer and the layer (for example, the adhesive resin layer, the aforementioned adhesive layer and the like) adjacent thereto can improve, the delamination due to stress such as during cold molding and the occurrence of cracks due to the stress can be suppressed, and the reduction of the insulation properties after molding can be prevented.

Advantageous Effect of the Invention

The present invention can provide an exterior material for a lithium ion battery which can sufficiently maintain the insulation properties after molding. Even if the exterior material for the lithium ion battery of the present invention has a thin film configuration, for example, the total thickness on the inner layer side, rather than the metal foil layer, is 35 μm or less, in particular, is a configuration in which the total thickness of the sealant layer is 30 μm or less, the insulation properties can be sufficiently maintained after molding. Furthermore, even in a thin-film configuration, the exterior material for the lithium ion battery of the present invention can have a sufficient heat sealing strength and degassing heat sealing strength while sufficiently maintaining the insulation properties after molding.

DESCRIPTION OF REPRESENTATIVE EMBODIMENTS

Figure 1:
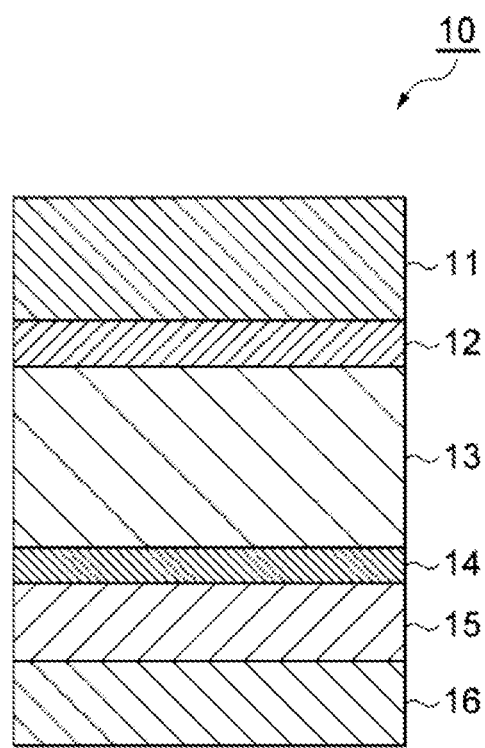
FIG. 1 is a schematic sectional view of an exterior material for a lithium ion battery according to an embodiment of the present invention.

Below, the preferred embodiments of the present invention will be explained in detail with reference to the drawings. Note that, in the drawings, like or corresponding portions are designated by like reference numerals and are not repeatedly illustrated. Moreover, the dimensional ratios in the drawings are not limited to those ratios indicated therein. Also, these preferred embodiments are intended to be representative of the present invention. The present invention is not necessarily intended to be limited to these preferred embodiments.

The exterior material for the lithium ion battery of the present embodiment comprises at least a substrate layer, a metal foil layer, and a sealant layer comprised of a resin in that order, wherein the sealant layer contains an anionic functional group-containing layer which contains a compound having an anionic functional group. Several aspects of the exterior material for the lithium ion battery of the present embodiment are exemplified and described below.

[Exterior Material for the Lithium Ion Battery]

FIG. 1 is a cross-sectional view schematically showing an embodiment of the exterior material for the lithium ion battery of the present embodiment. As shown in FIG. 1, an exterior material (the exterior material for the lithium ion battery) 10 of the present embodiment is a laminate in which a substrate layer 11, a first adhesive layer 12 formed on one surface of the substrate layer 11, a metal foil layer 13 formed on a surface of the first adhesive layer 12 opposite to that facing the substrate layer 11, a corrosion prevention treatment layer 14 formed on a surface of the metal foil layer 13 opposite to that facing the first adhesive layer 12, an adhesive resin layer 15 formed on a surface of the corrosion prevention treatment layer 14 opposite to that facing the metal foil layer 13, and a sealant layer 16 formed on a surface of the adhesive resin layer 15 opposite to that facing the corrosion prevention treatment layer 14 are sequentially laminated. In the exterior material 10, the substrate layer 11 is the outermost layer, and the sealant layer 16 is the innermost layer. Namely, the exterior material 10 is used with the substrate layer 11 facing toward the outer side of the lithium ion battery, and the sealant layer 16 facing toward the inner side of the lithium ion battery. Each layer will be described below.

<Substrate Layer 11>

The substrate layer 11 is provided for the purpose of imparting heat resistance in the sealing step during lithium ion battery production, and providing a countermeasure against pinholes that can occur during processing and distribution, and a resin layer having insulation properties is preferably used. Examples of such resin films that can be used include single layer or multilayer films of two or more layers of oriented or unstretched films such as a polyester film, a polyamide film, a polypropylene film and the like. In more detail, it is possible to use a coextruded multilayer oriented film subjected to being oriented after using an adhesive resin to coextrude a polyethylene terephthalate film (PET) and a nylon film (Ny).

The thickness of the substrate layer 11 is preferably 6 to 40 μm, and more preferably 10 to 25 μm. The pinhole resistance and the insulation properties of the exterior material 10 for the lithium ion battery are likely to improve by the thickness of the substrate layer 11 being 6 μm or more. On the one hand, the deep drawing property of the exterior material 10 for the lithium ion battery can be sufficiently maintained by the thickness of the substrate layer 11 being 40 μm or less.

<First Adhesive Layer 12>

The first adhesive layer 12 is a layer for adhering the substrate layer 11 with the metal foil layer 13. Specific examples of the material constituting the first adhesive layer 12 include a polyurethane resin obtained by allowing an isocyanate compound having two or more functional groups to act on a main agent such as a polyester polyol, polyether polyol, acrylic polyol or carbonate polyol.

The polyester polyol can include one or more types of aliphatic dibasic acids such as succinic acid, glutaric acid, adipic acid, pimelic acid, suberic acid, azelaic acid, sebacic acid or brazilic acid; one or more types of aromatic dibasic acids such as isophthalic acid, terephthalic acid or naphthalene dicarboxylic acid, one or more types of aliphatic diols such as ethylene glycol, propylene glycol, butanediol, neopentyl glycol, methyl pentanediol, hexanediol, heptanediol, octanediol, nonanediol, decanediol or dodecanediol; one or more types of alicyclic diols such as cyclohexanediol or hydrogenated xylylene glycol; and one or more types of aromatic diols such as xylylene glycol.

Further, examples of the polyether polyol include polyester urethane polyols, in which hydroxyl groups on both ends of the polyester polyol obtained using the aforementioned dibasic acid and a diol underwent chain elongation using an isocyanate compound alone selected from 2,4- or 2,6-tolylene diisocyanate, xylylene diisocyanate, 4,4'-diphenylmethane diisocyanate, methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate and isopropylidene dicyclohexyl-4,4'-diisocyanate or an adduct, a biuret, or an isocyanurate comprising the aforementioned isocyanate compound selected from at least one of the above.

Examples of the polyether polyols that can be used include ether-based polyols such as polyethylene glycol, polypropylene glycol, and polyether urethane polyols obtained by a chain extender acting on the isocyanate compounds.

Examples of acrylic polyols that can be used include acrylic resins obtained by polymerization using the previously described acrylic monomers.

The carbonate polyol can be obtained by reacting a carbonate compound with a diol. Examples of carbonate compounds that can be used include dimethyl carbonate, diphenyl carbonate and ethylene carbonate. On the one hand, examples of diols that can be used include carbonate polyols obtained by using a mixture of one or more aliphatic diols such as ethylene glycol, propylene glycol, butanediol, neopentyl glycol, methyl pentanediol, hexanediol, heptanediol, octanediol, nonanediol, decanediol or dodecanediol, alicyclic diols such as cyclohexanediol or hydrogenated xylylene glycol; aromatic diols such as xylylene glycol, or polycarbonate urethane polyols obtained by chain elongation using an aforementioned isocyanate compound.

These various polyols can be used alone or in a combination of two or more, according to the functions and performance sought in the exterior material. Further, the use of an aforementioned isocyanate-based compound as a curing agent in these main agents enables their use as polyurethane-based adhesives.

Furthermore, a carbodiimide compound, an oxazoline compound, epoxy compound, a phosphorous compound, a silane coupling agent and the like may be formulated in the aforementioned polyurethane resin for the purpose of promoting adhesion.

Examples of the carbodiimide compound include N,N'-di-o-tolylcarbodiimide, N,N'-diphenylcarbodiimide, N,N'-di-2,6-dimethylphenylcarbodiimide, N,N'-bis(2,6-diisopropylphenyl) carbodiimide, N,N'-dioctyldecylcarbodiimide, N-tolyl-N'-cyclohexylcarbodiimide, N,N'-di-2,2-di-t-butylphenylcarbodiimide, N-triyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide and N,N'-di-p-tolylcarbodiimide.

Examples of the oxazoline compound include monooxazoline compounds such as 2-oxazoline, 2-methyl-2-oxazoline, 2-phenyl-2-oxazoline, 2,5-dimethyl-2-oxazoline and 2,4-diphenyl-2-oxazoline; and dioxazoline compounds such as 2,2'-(1,3-phenylene)-bis(2-oxazoline), 2,2'-(1,2-ethylene)-bis(2-oxazoline), 2,2'-(1,4-butylene)-bis(2-oxazoline) and 2,2'-(1,4-phenylene)-bis(2-oxazoline).

Examples of the epoxy compound include diglycidyl ethers of aliphatic diols such as 1,6-hexanediol, neopentyl glycol and polyalkylene glycol; polyglycidyl ethers of aliphatic polyols such as sorbitol, sorbitan, polyglycerol, pentaerythritol, diglycerol, glycerol and trimethylolpropane; polyglycidyl ethers of alicyclic polyols such as cyclohexane dimethanol; diglycidyl esters or polyglycidyl esters of aliphatic and aromatic polyvalent carboxylic acids such as terephthalic acid, isophthalic acid, naphthalene dicarboxylic acid, trimellitic acid, adipic acid and sebacic acid; diglycidyl ethers or polyglycidyl ethers of polyvalent phenols such as resorcinol, bis-(p-hydroxyphenyl)methane, 2,2-bis-(p-hydroxyphenyl) propane, tris-(p-hydroxyphenyl)methane and 1,1,2,2-tetrakis(p-hydroxyphenyl)ethane; N-glycidyl derivatives of amines such as N,N'-diglycidyl aniline, N,N,N-diglycidyl toluidine and N,N,N',N'-tetraglycidyl-bis-(p-aminophenyl)methane; triglycidyl derivatives of aminophenols; triglycidyltris(2-hydroxyethyl)isocyanurate; triglycidyl isocyanurate; ortho-cresol epoxies; and phenol novolac epoxies.

Examples of the phosphorous compound include tris(2,4-di-t-butylphenyl) phosphite, tetrakis(2,4-di-t-butylphenyl) 4,4'-biphenylene phosphonite, bis(2,4-di-t-butylphenyl)pentaerythritol-di-phosphite, bis(2,6-di-t-butyl-4-methylphenyl)pentaerythritol-di-phosphite, 2,2-methylenebis(4,6-di-t-butylphenyl)octyl phosphite, 4,4'-butylidene-bis(3-methyl-6-t-butylphenyl-di-tridecyl) phosphite, 1,1,3-tris(2-methyl-4-ditridecylphosphite-5-t-butyl-phenyl)butane, tris(mixed mono- and di-nonylphenyl) phosphite, tris(nonylphenyl)phosphite and 4,4'-isopropylidenebis(phenyl-dialkylphosphite).

Examples of the silane coupling agent that can be used include various silane coupling agents such as vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane and N-β(aminoethyl)-γ-aminopropyltrimethoxysilane.

Further, various other additives and stabilizers may be formulated in an aforementioned polyurethane resin, according to the performance required of the adhesive.

The thickness of the first adhesive layer 12 is not specifically limited, but, is preferably 1 to 10 μm, and more preferably 3 to 7 μm from the viewpoint of obtaining the desired adhesive strength, following property and processability.

<Metal Foil Layer 13>

The metal foil layer 13 has a water vapor barrier property for preventing moisture from entering the inside of the lithium ion battery. Further, the metal foil layer 13 has ductility and malleability to perform deep drawing. As the metal foil layer 13, various metal foils made of aluminum, stainless steel, and the like can be used, and in terms of the mass (specific gravity), the dampproofness, the processability and the cost, is preferably an aluminum foil.

A general soft aluminum foil can be used as the aluminum foil, but an aluminum foil containing iron is preferable for the purpose of imparting further pinhole resistance and ductility and malleability during forming. In the aluminum foil (100% mass), the iron content within the aluminum foil is preferably 0.1 to 9.0 mass %, and more preferably 0.5 to 2.0 mass %. With the iron content being 0.1 mass % or more, an exterior material 10 having better pinhole resistance and ductility and malleability can be obtained. With the iron content being 9.0 mass % or less, an exterior material 10 having better flexibility can be obtained.

Further, from the viewpoint of imparting the desired ductility and malleability during forming, an annealed soft aluminum foil (e.g., aluminum foil made of materials 8021 and 8079 of the Japanese Industrial Standards) is more preferable as the aluminum foil.

The thickness of the metal foil layer 13 is not specifically limited, but, is preferably 9 to 200 μm, and more preferably 15 to 100 μm, with reference to the barrier properties, pinhole resistance, and processibility.

When using an aluminum foil in the metal foil layer 13, an untreated aluminum foil may be used as the aluminum foil, but an aluminum foil subjected to a degreasing treatment is preferably used from the viewpoint of imparting electrolytic solution resistance. The degreasing treatments are largely classified into a wet type degreasing treatment and a dry type degreasing treatment.

Examples of the wet type degreasing treatment include acid degreasing and alkali degreasing. Examples of the acid used for the acid degreasing include inorganic acids such as sulfuric acid, nitric acid, hydrochloric acid, and hydrofluoric acid. These inorganic acids may be used alone or in a combination of two or more kinds thereof. Further, various metal salts serving as supply sources of Fe ions or Ce ions and the like may be formulated into the inorganic acid in accordance with need, from the viewpoint of improving the aluminum foil etching effect. As the alkali used in alkaline degreasing, a strong etching type alkali such as sodium hydroxide can be considered. Further, a weak alkali or an alkali that is formulated with a surfactant may be used. These degreasing treatments are carried out by immersion or spraying.

The dry type degreasing treatment, a method for performing a degassing treatment in a step of annealing aluminum can be mentioned. Further, in addition to the degreasing treatment, a flame treatment or a corona discharge treatment may be performed. Furthermore, a degreasing treatment such as oxidatively decomposing and removing contaminants with radical oxygen generated by irradiating with a specific wavelength of ultraviolet light may be used.

Note that, when the aluminum foil is degreased, only one surface of the aluminum foil may be degreased, or both surfaces may be degreased.

<Corrosion Prevention Treatment Layer 14>

The corrosion prevention treatment layer 14 is a layer which is provided to decrease the corrosion of the metal foil layer 13 caused by hydrofluoric acid generated by the electrolytic solution, or, by the reaction of the electrolytic solution with moisture. The corrosion prevention treatment layer 14 is formed, for example, by a degreasing treatment, hydrothermal modification treatment, anodization, chemical conversion treatment, or a combination of these treatments.

Examples of the degreasing treatment include acid degreasing and alkaline degreasing. Examples of the acid degreasing include methods using an inorganic acid such as sulfuric acid, nitric acid, hydrochloric acid or hydrofluoric acid either alone or mixtures of these acids. Further, by using an acid degreasing agent obtained by dissolving a fluorine-containing compound such as monosodium ammonium difluoride with the aforementioned inorganic acids, specifically, when the aluminum foil was used in the metal foil layer 13, in addition to obtaining aluminum degreasing effects, fluorides of aluminum can be formed in a passive state, which are effective in terms of hydrofluoric acid resistance. Examples of the alkaline degreasing include methods using sodium hydroxide and the like.

Examples of the hydrothermal modification treatment include boehmite treatment obtained by immersing aluminum foil in boiling water containing triethanolamine.

An example of the anodization includes an alumite treatment.

The chemical conversion treatment includes an immersion type and a coating type. The immersion type chemical conversion treatment includes, for example, chromate treatment, zirconium treatment, titanium treatment, vanadium treatment, molybdenum treatment, calcium phosphate treatment, strontium hydroxide treatment, cerium treatment, ruthenium treatment, or various chemical conversion treatments of mixed phases thereof. On the other hand, the coating type chemical conversion treatment includes a method of coating a coating agent having a corrosion prevention performance onto the metal foil layer 13.

Among these corrosion prevention treatments, if at least part of the corrosion prevention treatment layer is formed by any of hydrothermal modification treatment, anodization and chemical conversion treatment, the degreasing treatment is preferably performed in advance. Note that, if a degreased metal foil is used as the metal foil layer 13, the degreasing treatment is not necessary in forming the corrosion prevention treatment layer 14.

The coating agent used for the coating type chemical conversion treatment preferably contains trivalent chromium. Further, the coating agent used for the coating type chemical conversion treatment may contain at least one polymer selected from the group consisting of a cationic polymer and an anionic polymer to be described hereinafter.

Further, among the aforementioned treatments, the hydrothermal modification treatment and anodization in particular cause the surface of the aluminum foil to be dissolved by a treatment agent resulting in the formation of an aluminum compound (boehmite or alumite) that has superior corrosion resistance. Consequently, since this results in the formation of a co-continuous structure extending from the aluminum foil layer 13 which uses the aluminum foil to the corrosion prevented treated layer 14, it is possible to form the corrosion prevention treated layer 14 by a simple coating method which is included in the definition of the chemical conversion treatment, but not included in the definition of chemical conversion treatment to be subsequently described. Examples of the simple coating method includes a method using a sol of a rare earth element oxide such as cerium oxide having a mean particle size of 100 nm or less having an aluminum corrosion preventive effect (inhibitor effect) and is also a preferable material in terms of environmental aspects. The use of this method makes it possible to impart a corrosion prevention effect to a metal foil such as an aluminum foil even when using an ordinary coating method.

Examples of the aforementioned rare-earth oxide sol include various solvents such as an aqueous solvent, an alcohol-based solvent, a hydrocarbon-based solvent, a ketone-based solvent, an ester-based solvent, an ether-based solvent, and the like. An aqueous solvent is preferable.

Inorganic acids such as nitric acid, hydrochloric acid, phosphoric acid or salts thereof, and organic acids such as acetic acid, malic acid, ascorbic acid, and lactic acid are usually used in dispersion stabilizers in order to stabilize the dispersion of the aforementioned rare-earth oxide sol. Among these dispersion stabilizers, specifically, phosphoric acid is expected to (1) stabilize the dispersion of the sol, (2) improve the adhesion with the metal foil layer 13 by use of the aluminum chelating ability of the phosphoric acid, (3) impart electrolytic solution resistance by capturing aluminum ions eluted by the effect of hydrofluoric acid (formation of a passive state), (4) improve a cohesive force of the corrosion prevention treatment layer 14 (oxide layer) due to the dehydration condensation of the phosphoric acid even at low temperatures, and the like in the exterior material 10

Examples of the phosphoric acid or phosphate include orthophosphoric acid, pyrophosphoric acid, metaphosphoric acid, or an alkali metal salt or an ammonium salt thereof. Thereamong, from the viewpoint of the functional expression in the exterior material 10, a condensed phosphoric acid, such as trimetaphosphoric acid, tetrametaphosphoric acid, hexametaphosphoric acid, ultrametaphosphoric acid, or an alkali metal salt or an ammonium salt thereof is preferable. Further, when taking into consideration the dry film-forming properties (drying capacity and heat quantity) at the time when the corrosion prevention treatment layer 14 comprising the rare-earth oxide is formed by various coating methods using the rare-earth oxide sol, a sodium salt having good dehydration condensation at low temperatures is preferable. As the phosphate, a water soluble salt is preferable.

The content of phosphoric acid (or a salt thereof) is preferably 1 to 100 parts by mass relative to 100 parts by mass of the rare-earth oxide. If the aforementioned content of a phosphoric acid or a salt thereof is not less than 1 part by mass, the stability of the rare-earth oxide sol is improved and the function of the exterior material 10 becomes better. The content of a phosphoric acid or a salt thereof is preferably 5 parts by mass or more relative to 100 parts by mass of the rare-earth oxide. If the content of the phosphoric acid or a salt thereof is not more than 100 parts by mass, the function of the rare-earth oxide sol is enhanced, and the performance for preventing corrosion due to the electrolytic solution is excellent. The aforementioned content of the phosphoric acid or a salt thereof is preferably 50 parts by mass or less relative to 100 parts by mass of the rare-earth oxide, and more preferably 20 parts by mass or less.

The corrosion prevention treatment layer 14 formed by the aforementioned rare-earth oxide sol is an aggregate of inorganic particles, thus, there is the risk that the cohesive force of the layer itself will be low even after undergoing the drying curing process. Therefore, the corrosion prevention treatment layer 14 in this case is preferably compounded by the following anionic polymers, or cationic polymers in order to supplement the cohesive force.

The anionic polymer includes a polymer having a carboxyl group, and includes, for example, poly(meth)acrylic acid (or a salt thereof) or a copolymer containing poly(meth) acrylic acid as a main component. The copolymerization component of the copolymer includes an alkyl (meth)acrylate monomer (having a methyl group, an ethyl group, an n-propyl group, an i-propyl group, an n-butyl group, an i-butyl group, a t-butyl group, a 2-ethylhexyl group, or a cyclohexyl group as an alkyl group); an amide group-containing monomer, such as (meth)acrylamide, N-alkyl (meth)acrylamide, or N,N-dialkyl (meth)acrylamide (having a methyl group, an ethyl group, an n-propyl group, an i-propyl group, an n-butyl group, an i-butyl group, a t-butyl group, a 2-ethylhexyl group, a cyclohexyl group, etc. as an alkyl group), N-alkoxy (meth)acrylamide, or N,N-dialkoxy (meth)acrylamide (having a methoxy group, an ethoxy group, a butoxy group, an isobutoxy group, etc. as an alkoxy group), N-methylol (meth)acrylamide, or N-phenyl (meth) acrylamide; a hydroxyl group-containing monomer, such as 2-hydroxyethyl (meth)acrylate, or 2-hydroxypropyl (meth) acrylate; a glycidyl group-containing monomer, such as glycidyl (meth)acrylate, or allyl glycidyl ether; a silane-containing monomer, such as (meth)acryloxypropyltrimethoxysilane, or (meth)acryloxypropyltriethoxysilane; or an isocyanate.

These anionic polymers also serve to improve the stability of the corrosion prevention treatment layer 14 (oxide layer) obtained using the rare-earth oxide sol. This is achieved due to the effect of protecting a hard and brittle oxide layer with the acrylic resin component, and, also by the effect of capturing (cation catcher) ionic contamination (particularly, sodium ion) derived from the phosphoric acid contained in the rare-earth oxide sol. In short, if an ion of an alkali metal such as sodium or an alkaline earth metal ion is specifically contained within the corrosion prevention treatment layer 14 obtained by using the rare-earth oxide sol, it becomes easy for the corrosion prevention treatment layer 14 to deteriorate starting in the location containing the ion. Therefore, the sodium ion or the like contained in the rare earth element oxide sol is fixed with the anionic polymer to improve the durability of the corrosion inhibition treatment layer 14.

The corrosion prevention treatment layer 14 in which the anionic polymer was combined with the rare-earth oxide sol has a corrosion prevention performance that is equivalent to the corrosion prevention treatment layer 14 formed by subjecting the aluminum foil to a chromate treatment. The anionic polymer preferably has a structure in which an essentially water-soluble polyanionic polymer is crosslinked. Examples of crosslinking agents used in the formation of this configuration include a compound having an isocyanate group, a glycidyl group, a carboxyl group or an oxazoline group.

Compounds having an isocyanate group include, for example, a diisocyanate such as tolylene diisocyanate, xylylene diisocyanate or a hydrogenated product thereof, hexamethylene diisocyanate, 4,4'-diphenylmethane diisocyanate or a hydrogenated product thereof, isophorone diisocyanate; or a polyisocyanate such as an adduct form obtained by reacting these isocyanates with polyhydric alcohol, such as trimethylolpropane, a biuret obtained by reacting the isocyanates with water, or an isocyanurate as a trimer; or blocked polyisocyanate obtained by blocking these polyisocyanates with an alcohol, a lactam, an oxime, or the like.

Examples of the compound having a glycidyl group include an epoxy compound obtained by permitting epichlorohydrin to act on a glycol, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, or neopentyl glycol; an epoxy compound obtained by permitting epichlorohydrin to act on a polyhydric alcohol, such as glycerin, polyglycerin, trimethylolpropane, pentaerythritol, or sorbitol, or an epoxy compound obtained by permitting epichlorohydrin to act on a dicarboxylic acid, such as phthalic acid, terephthalic acid, oxalic acid, or adipic acid.

Examples of the compound having a carboxyl group includes various aliphatic or aromatic dicarboxylic acids and the like. Further, poly(meth)acrylic acid and alkaline (earth) metal salt of poly(meth)acrylic acid may be used.

Examples of the compound having an oxazoline group include a low molecular weight compound having two or more oxazoline units, or when using a polymerizable monomer such as isopropenyloxazoline, a compound obtained by copolymerizing with an acrylic monomer such as (meth) acrylic acid, (meth)acrylic alkyl ester, and hydroxyalkyl (meth)acrylate.

Further, a crosslinking point may be siloxane-bonded to an anionic polymer by selectively reacting an amine and a functional group similar to a silane coupling agent. In this case, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β(aminoethyl)-γ-aminopropyltrimethoxysilane, or γ-isocyanatepropyltriethoxysilane and the like can be used. In particular, in consideration of reactivity with an anionic polymer or a copolymer thereof, epoxysilane, aminosilane, and isocyanate silane are preferable.

The ratio of these crosslinking agents to the anionic polymer is preferably 1 part by mass to 50 parts by mass and more preferably 10 parts by mass to 20 parts by mass relative to 100 parts by mass of the anionic polymer. If the ratio of the crosslinking agent is equal to or greater than 1 part by mass relative to 100 parts by mass of the anionic polymer, a crosslinked structure is formed with sufficient ease. If the ratio of the crosslinking agent is equal to or less than 50 parts by mass relative to 100 parts by mass of the anionic polymer, the pot life of a coating liquid improves.

The method used to crosslink the anionic polymer is not limited to the aforementioned crosslinking agents, and may be a method consisting of the formation of ionic crosslinks using a titanium or zirconium compound.

Polymers having an anime may be included as the cationic polymer, and the cationic polymer may include polyethylene imine, ionic polymer complexes composed of polyethylene imine and a polymer having carboxylic acid, primary amine-grafted acrylic resin in which a primary amine is grafted to an acrylic backbone, polyamines or derivatives thereof, and aminophenol.

The cationic polymer is preferably used in combination with the crosslinking agent having a functional group capable of reacting with an amine and/or imine such as a carboxyl group or glycidyl group. A polymer having a carboxylic acid that forms an ionic polymer complex with polyethylene imine can also be used as a crosslinking agent used in combination with the cationic polymer, and examples thereof include polycarboxylic acids (salts) such as polyacrylic acid or an ionic salt thereof, copolymers in which a co-monomer has been introduced therein, and polysaccharides having a carboxyl group such as carboxymethyl cellulose or an ionic salt thereof. Examples of polyallylamines include homopolymers and copolymers of allylamines, allylamine amidosulfate, diallylamines or dimethylallylamine. These amines may be in the form of free amines or may be stabilized by acetic acid or hydrochloric acid. In addition, maleic acid or sulfur dioxide and the like may be used as copolymer components. Moreover, types imparted with thermal crosslinkability by partial methoxylation of a primary amine can also be used, and aminophenol can also be used. Allylamines and derivatives thereof are particularly preferable.

In the present embodiment, cationic polymers are also described as constituent members composing the corrosion prevention treatment layer 14. The reason for this is that, as a result of conducting extensive studies using various compounds in order to impart electrolytic solution resistance and hydrofluoric acid resistance required by the exterior material for the lithium ion battery, it was determined that cationic polymers per se are compounds that are capable of imparting the required electrolytic solution resistance and hydrofluoric acid resistance. This is presumed to be the result of inhibiting damage to the aluminum foil by capturing fluorine ions with cationic groups (anion catcher).

Cationic polymers are preferable materials from the viewpoint of improving adhesion. In addition, since cationic polymers are water-soluble in the same manner as the aforementioned anionic polymers, imparting moisture resistance by forming a crosslinked structure is more preferable. The crosslinking agents explained in the section on anionic polymers can be used as the crosslinking agent when forming a crosslinked structure for the cationic polymer. In the case of using a rare earth oxide sol for the corrosion prevention treatment layer 14, a cationic polymer may be used for the protective layer thereof instead of using the previously described anionic polymer.

In order to allow a corrosion prevention treatment layer subjected to chemical conversion treatment as exemplified by chromate treatment to form an inclined structure with the aluminum foil, the aluminum foil is subjected to treatment using a chemical conversion treatment agent that incorporates hydrofluoric acid, hydrochloric acid, nitric acid, sulfuric acid or a salt thereof in particular, followed by forming a chemical conversion treatment layer on the aluminum foil by allowing a chromium- or non-chromium-based compound to act thereon. However, since the aforementioned chemical conversion treatment uses an acid for the chemical conversion treatment agent, this treatment is accompanied by deterioration of the working environment and corrosion of coating devices. On the other hand, the aforementioned coated type of the corrosion prevention treatment layer 14 is different than the chemical conversion treatment as exemplified by chromate treatment, and it is not necessary that the aforementioned coated type of corrosion prevention treatment layer 14 form an inclined structure with the metal foil layer 13 which used the aluminum foil. Consequently, the properties of the coating agent are not subjected to restrictions such as being acidic, alkaline or neutral, therefore, it is possible to realize a favorable working environment. In addition, the coated type of corrosion prevention treatment layer 14 is preferable since chromate treatment using a chromium compound requires alternatives in terms of environmental health.

On the basis of the above, (1) the rare-earth oxide sol only, (2) the anionic polymer only, (3) the cationic polymer only, (4) the rare-earth oxide sol+anionic polymer (layered compound), (5) the rare-earth oxide sol+cationic polymer (layered compound), (6) (the rare-earth oxide sol+anionic polymer:layered compound)/cationic polymer (multilayered laminate), (7) (the rare-earth oxide sol+cationic polymer: layered compound)/anionic polymer (multilayered laminate), and the like can be included as cases of combinations of the abovementioned coating type of corrosion prevention treatment. Thereamong, (1) and (4) to (7) are preferable, and (4) to (7) are more preferable. However, the present embodiment is not limited to the aforementioned combinations. For example, as a case of selection of the corrosion prevention treatment, the cationic polymer is a remarkably preferable material in the point that the adhesion with the modified polyolefin resin explained in the section of the sealant adhesive layer (the adhesive resin layer or the second adhesive layer) is good, thus, in the case when the sealant adhesive layer is constituted by a modified polyolefin resin, a design which provides the cationic polymer on a side abutting the sealant adhesive layer (for example, configurations such as Configurations (5) and (6)) is possible.

Further, the corrosion prevention treatment layer 14 is not limited to the aforementioned layers. For example, the corrosion prevention treatment layer 14 may also be formed using a treatment agent incorporating phosphoric acid and a chromium compound in a resin binder (such as aminophenol) in the manner of a known technology in the form of a chromate coating. The use of such a treatment agent enables the formation of a layer that is provided with both a corrosion prevention function and adhesion. Further, a layer can be obtained that is provided with both a corrosion prevention function and adhesion by using a coating agent in which a rare earth oxide sol and polycationic polymer or polyanionic polymer have been preliminarily incorporated into a single liquid, although the stability of the coating liquid must be taken into consideration.

The mass per unit surface area of the corrosion prevention treatment layer 14, even if a single layer or a multilayer, is preferably 0.005 to 0.200 $g/m^2$, and more preferably 0.010 to 0.100 $g/m^2$. If the aforementioned mass per unit surface area is 0.005 $g/m^2$ or more, a corrosion prevention function is easily imparted to the metal foil layer 13. Further, even if the aforementioned mass per unit surface area exceeds 0.200 $g/m^2$, there is little change in the corrosion prevention function. On the other hand, in the case of using a rare earth oxide sol, heat-curing during drying may become inadequate if the coated film is excessively thick, thereby resulting in the risk of a decrease in cohesion. Note that, the thickness of the corrosion prevention treatment layer 14 can be converted from the specific gravity thereof.

<Adhesive Resin Layer 15>

The adhesive resin layer 15 is roughly comprised of an adhesive resin composition as the main component and additive components in accordance with need. The adhesive resin composition is not specifically limited, but can comprise a modified polyolefin resin (a) component, and preferably comprises the modified polyolefin resin (a) component and a macrophase-separation thermoplastic elastomer (b) component. Further, the additive component preferably contains the polypropylene and/or the propylene-α-olefin copolymer having an atactic structure. Thereamong, the additive component more preferably contains the polypropylene or propylene-α-olefin copolymer having an atactic structure (c). Each component will be described below.

(Modified Polyolefin Resin (a))

The modified polyolefin resin (a) is preferably a resin in which a polyolefin resin has been graft-modified by an unsaturated carboxylic acid derivative component derived from any of an unsaturated carboxylic acid, an unsaturated carboxylic acid anhydride, an unsaturated carboxylic acid ester.

Examples of the polyolefin resin include low density polyethylene, medium density polyethylene, high density polyethylene, ethylene-α-olefin copolymer, homo-, block-, or random polypropylene, propylene-α-olefin copolymers, but is preferably a polypropylene-based resin from the viewpoint of the heat resistance.

Examples of the compound used when graft-modifying these polyolefin resins include an unsaturated carboxylic acid derivative component derived from any of an unsaturated carboxylic acid, an unsaturated carboxylic acid anhydride, or an unsaturated carboxylic acid ester.

Specifically, the unsaturated carboxylic acid includes acrylic acid, methacrylic acid, maleic acid, fumaric acid, itaconic acid, citraconic acid, tetrahydrophthalic acid, dicyclo[2,2,1]hepto-2-ene-5,6-dicarboxylic acid and the like.

Examples of the unsaturated carboxylic acid anhydride include maleic anhydride, itaconic anhydride, citraconic anhydride, tetrahydrophthalic anhydride, dicyclo[2,2,1]hepto-2-ene-5,6-dicarboxylic acid anhydride and the like.

Examples of the unsaturated carboxylic acid ester include methyl acrylate, methyl methacrylate, ethyl methacrylate, butyl methacrylate, dimethyl maleate, monomethyl maleate, diethyl fumarate, dimethyl itaconate, diethyl citraconate, tetrahydrophthalic anhydride, dicyclo[2,2,1]hepto-2-ene-5, 6-dimethyl dicarboxylate.

When the sealant layer contains the polyethylene-based resin, a compound (for example, ethylene-methacrylic acid copolymer and ethylene-ethyl acrylate-maleic anhydride copolymer) in which a compound having a carboxyl group or a carboxylic anhydride group is copolymerized with ethylene may also be used. Note that, from the viewpoints of the heat resistance and the adhesion strength, a graft-polymerized resin is preferably used. A polyethylene-based resin such as low density polyethylene, medium density polyethylene, high density polyethylene, and ethylene-α-olefin copolymer is preferable as the polyolefin resin.

The modified polyolefin resin (a) can be produced by graft polymerizing (graft modifying) 0.2 to 100 parts by mass of the aforementioned unsaturated carboxylic acid derivative component with 100 parts by mass of the polyolefin resin (a) serving as a base in the presence of the radical initiator. The reaction temperature of the graft modification is preferably 50° C. to 250° C. and more preferably 60° C. to 200° C. Further, while suitably set according to the production method, the reaction time in the case of a molten graft polymerization using a twin-screw extruder is, for example, the residence time in the extruder, and specifically, is preferably 2 minutes to 30 minutes and more preferably 5 minutes to 10 minutes. Note that, graft modification can be carried out under conditions of either normal pressure or under pressurization.

Examples of the radical initiator used in graft modification include organic peroxides such as alkyl peroxides, aryl peroxides, acyl peroxides, ketone peroxides, peroxyketals, peroxycarbonates, peroxyesters and hydroperoxides.

These organic peroxides can be suitably selected according to the aforementioned conditions for reaction temperature and reaction time. For example, in the case of a molten graft reaction using a twin-screw extruder, an alkyl peroxide, peroxyketal or peroxyester is preferable, and specifically, di-t-butyl peroxide, 2,5-dimethyl-2,5-di-t-butylperoxide-3-benzene or dicumyl peroxide is more preferable.

A modified polyolefin resin (a) is preferably a polyolefin resin that has been modified with maleic anhydride, and examples thereof include "Amber" (trade name) manufactured by Mitsui Chemicals Inc., "Modic" (trade name) manufactured by Mitsubishi Chemical Corp., and the like. This kind of modified polyolefin resin (a) component exhibits good reactivity with a polymer having various metals or various functional groups, thus, adhesion can be imparted to the adhesive resin layer 15 using the reactivity, and the electrolytic solution resistance can improve. If the sealant layer contains a polyethylene-based resin, an acid-modified polyethylene resin that has been modified with maleic anhydride is preferable.

(Macrophase-Separation Thermoplastic Elastomer (b))

The macrophase-separation thermoplastic elastomer (b) forms a macrophase-separation structure having a dispersed phase size in a range in excess of 200 nm, to 50 μm or less, relative to the modified polyolefin resin (a).

By the adhesive resin composition comprising a macrophase-separation thermoplastic elastomer (b) component, the residual stress generated during lamination of the modified polyolefin resin (a) component and the like which is the main component for forming the adhesive resin layer 15 can be released, and viscoelastic adhesion can be imparted to the adhesive resin layer 15. Therefore, the adhesion of the adhesive resin layer 15 can further improve, and the exterior material 10 having good electrolytic solution resistance can be obtained.

The macrophase-separation thermoplastic elastomer (b) is present in the form of a sea-island structure on the modified polyolefin resin (a), but if the dispersed phase size is 200 nm or less, it becomes difficult to impart an improvement of viscoelastic adhesion. On the other hand, if the dispersed phase size is in excess of 50 μm, since the modified polyolefin resin (a) and the macrophase-separation thermoplastic elastomer (b) are substantially incompatible, the laminate suitability (processability) decreases considerably, and it becomes easy for the material physical strength of the adhesive resin layer 15 to deteriorate. Therefore, the dispersed phase size is preferably 500 nm to 10 μm.

Examples of the macrophase-separation thermoplastic elastomer (b) include a polyolefin-based thermoplastic elastomer obtained by copolymerizing at least one of ethylene and propylene with a member selected from α-olefin selected from the group consisting of 1-butene, 1-pentene, 1-hexene, 1-octene and 4-methyl-1-pentene.

Further, commercially available products can be used, and, for example, "Tafiner" (trade name) manufactured by Mitsui Chemicals Inc., "Zelas" (trade name) manufactured by Mitsubishi Chemical Corp., or "Catalloy" (trade name) manufactured by Montell Co., and the like is suitable.

In the adhesive resin layer 15, the content of the macrophase-separation thermoplastic elastomer (b) component relative to the modified polyolefin resin (a) component in the adhesive resin composition is preferably 1 to 40 parts by mass with respect to 100 parts by mass of the modified polyolefin resin (a) component, and more preferably 5 to 30 parts by mass. If the content of the macrophase-separation thermoplastic elastomer (b) component is less than 1 part by mass, the improvement of the adhesion of the adhesive resin layer cannot be anticipated. On the other hand, if the content of the macrophase-separation thermoplastic elastomer (b) component is in excess of 40 parts by mass, essentially, the processability remarkably deteriorates due to the compatibility between the modified polyolefin resin (a) component and the macrophase-separation thermoplastic elastomer (b) component being low. Further, the macrophase-separation thermoplastic elastomer (b) component is not a resin which shows adhesion, thus, the adhesion of the adhesive resin layer 15 to another layer such as the sealant layer 16 or the corrosion prevention treatment layer 14 easily deteriorates.

(Polypropylene or Propylene-α-Olefin Copolymer Having an Atactic Structure (c))

The adhesive resin layer 15 preferably contains the polypropylene or the propylene-α-olefin copolymer having an atactic structure (hereinafter, simply referred to as "component (c)") as the additive component. Component (c) is a perfect amorphous resin component.

The polypropylene or the propylene-α-olefin copolymer having an atactic structure means that the orientation of the side chain of at least one of propylene and α-olefin is an atactic structure. In other words, the following four cases can be provided as such a configuration.

(1) The case when the orientation of the side chain of the propylene chain of polypropylene is an atactic structure.

(2) The case when the orientation of the side chain of the propylene chain in the propylene-α-olefin copolymer is an atactic structure.

(3) The case when the orientation of the side chain of the α-olefin chain in the propylene-α-olefin copolymer is an atactic structure.

(4) The case when the orientation of the side chain of the propylene/α-olefin combined chain in the propylene-α-olefin copolymer is an atactic structure.

The atactic structure of the propylene or the propylene-α-olefin copolymer according to the present embodiment can be verified by, for example, the following method. This method, first, uses a transition metal complex used for the polymerization of the propylene or the propylene-α-olefin copolymer according to the present embodiment to polymerize a homopolypropylene. When each signal intensity expressed as [mm], [mr], and [rr] attributed to mm, mr, and rr of the propylene methyl carbon is determined from the $^{13}$C-NMR spectrum, F(1) as defined by the following formula can be obtained. When the value of F(1) obtained by the formula is 40 to 60, inclusive, preferably 43 to 57, and further preferably 45 to 55, it can be judged that the homopolypropylene obtained by the abovementioned polymerization has an atactic structure. If the value of F(1) is within the aforementioned range, the generation of cracks in the adhesive resin layer due to stress such as cold molding can be further suppressed and the insulation properties after molding can be further improved.

$$F(1)=100\times[mr]/([mm]+[mr]+[rr])$$

The effect of adding the additive component (c) to the adhesive resin composition which is the main component in the adhesive resin layer 15, will be explained below.

Component (c) is compatible with the modified polyolefin resin (a) component in the adhesive resin composition in a state in which the adhesive resin layer 15 is molten, but is discharged to the outside of the crystal when crystallized due to cooling, and separates in phase. Accordingly, component (c) does not interfere with the degree of crystallization of the modified polyolefin resin (a) component in the adhesive resin composition which is the main component. Further, by adding component (c) to the adhesive resin layer 15, the concentration of the modified polyolefin resin (a) component is diluted by component (c) and the crystal growth is suppressed, thus, it is possible to decrease the crystal size (spherulite size) of the adhesive component (i.e., the modified polyolefin resin (a) component) of the base resin. Further, component (c) which has been discharged outside the crystal is uniformly dispersed in the periphery of the micro-spherulites of the modified polyolefin resin (a) component.

Further, by adding component (c) as the additive component to the adhesive resin composition which is the main component in the adhesive resin layer 15, the degree of crystallization of the modified polyolefin resin component (a) in the adhesive resin layer 15 can be maintained while being able to impart flexibility, thus, it is possible to suppress the deterioration of the strength of lamination during the electrolytic solution swelling of the exterior material 10, and since the generation of void-crazing caused by stress during cold molding can be suppressed, and accordingly, the insulating property after molding can be further improved.

The ratio of component (c) in the adhesive resin layer 15 preferably has a lower limit of 2.5 mass %, and more preferably 5 mass % or more. However, the upper limit is preferably 60 mass %. If the ratio of component (c) in the adhesive resin layer 15 is less than 2.5 mass %, the effect by adding component (c) as stated above cannot be sufficiently obtained. On the other hand, if in excess of 60 mass % (i.e., if the ratio of the adhesive resin composition is less than 40 mass %), the adhesion of the adhesive resin layer 15 to another layer such as the sealant layer 16 or the corrosion prevention treatment layer 14 tends to easily deteriorate.

(Propylene-α-Olefin Copolymer (d) Having an Isotactic Structure)

The adhesive resin layer 15 preferably contains a propylene-α-olefin copolymer having an isotactic structure (hereinafter, simply referred to as "component (d)") in addition to the abovementioned component (c) as the additive component.

Component (d) is used as a compatible rubber component, when the modified polyolefin resin (a) in the adhesive resin component which is the main component of the adhesive resin layer 15 is specifically a polypropylene-based adhesive resin, and suppresses the crystallization of the modified polyolefin resin (a).

Namely, by adding component (d) as the additive component to the adhesive resin composition which is the main component in the adhesive resin layer 15, since the flexibility for relaxing the stress can be imparted, and the generation of void-crazing caused by stress during cold molding can be suppressed, the insulating property after molding can be further improved.

The ratio of the additive components (i.e., the total of component (c) and component (d)) in the adhesive resin layer 15 is preferably 5 to 60 mass %. If the ratio of the additive components in the adhesive resin layer 15 is less than 5 mass % (i.e., if the ratio of the adhesive resin composition is in excess of 95 mass %), the effect cannot be sufficiently obtained by adding the additives as stated above. On the other hand, if in excess of 60 mass % (i.e., if the ratio of the adhesive resin composition is less than 40 mass %), the adhesion of the adhesive resin layer 15 to another layer such as the sealant layer 16 or the corrosion prevention treatment layer 14 tends to easily deteriorate.

Note that, component (c) which is the active component in the adhesive resin layer 15 can be analyzed using nuclear magnetic resonance spectrometry (NMR) to determine the quantity by steric regularity evaluation.

On the other hand, the analysis of component (d) can be analyzed using Fourier transform infrared spectroscopy (FT-IR), and the formulation ratio can be verified by creating a calibration curve using an absorber attributed to the branching of α-olefin, and an absorber attributed to the specific absorber of the modified polyolefin resin (a).

The adhesive resin layer 15 may contain, other than the adhesive resin composition (i.e., the modified polyolefin resin (a) component or the macrophase-separation thermoplastic elastomer (b) component) and an additive component (i.e., component (c) or component (d)), various additives such as a flame retardant, slipping agent, anti-blocking agent, antioxidant, hindered amine light stabilizer, or tackifier, and the like in accordance with need.

The thickness of the adhesive resin layer 15 is not specifically limited, but is preferably the same or less than that of the sealant layer 16 from the viewpoints of the stress relaxation and the permeability of both moisture and the electrolytic solution.

<Sealant Layer 16>

The sealant layer 16 is a layer imparting sealability to the exterior material 10 by heat sealing. The sealant layer 16 may be a single layer and may be multiple layers.

The sealant layer 16 provides a composition including a resin such as the polyethylene-based resin or the polypropylene-based resin. In the case of a single layer, the sealant layer 16 is the anionic functional group-containing layer which contains a compound having the anionic functional group, and in the case of a multilayer, at least one of the layers thereamong is the anionic functional group-containing layer which contains a compound having the anionic functional group. The sealant layer 16 may be an anionic functional group-containing layer which contains a resin and the compound having the anionic functional group, and in the case of a multilayer, at least one of the layers thereamong may be the anionic functional group-containing layer which contains a resin and the compound having the anionic functional group. When the sealant layer 16 is constituted by a polyethylene-based resin, and the compound having the anionic functional group is the polyethylene-based resin having the anionic functional group, it is not necessary that the anionic functional group-containing layer contain another polyethylene-based resin. The case when the sealant layer is a multilayer will be described later.

A low density polyethylene (LDPE), a straight-chain low density polyethylene (L-LDPE), a high density polyethylene (HDPE) and the like may be included as the polyethylene-based resin. The polyethylene-based resin may be used singly or in a combination of two or more types.

Novatec LD (manufactured by Japan Polyethylene Corporation) and UBE polyethylene (manufactured by Ube-Maruzen Polyethylene) may be included as the low density polyethylene (LDPE).

A low density polyethylene having a density of 0.916 to 0.934 g/cm$^3$ can be used. Further, a low density polyethylene having a melting point of 100 to 120° C. can be used.

An ethylene-α-olefin copolymer obtained by a single site catalyst or a multi-site catalyst may be included as the straight-chain low density polyethylene (L-LDPE).

The density of the straight-chain low density polyethylene is preferably 0.925 to 0.945 g/cm$^3$, and more preferably 0.930 to 0.945 g/cm$^3$.

The melting point of the straight-chain low density polyethylene is preferably 115 to 130° C., and more preferably 120 to 130° C. When the melting point of the straight-chain low density polyethylene is within the aforementioned range, the heat resistant sealing strength tends to easily improve.

Novatec HD (manufactured by Japan Polyethylene Corporation) and Hi-Zex (manufactured by Prime Polymer Co., Ltd.) may be included as the high density polyethylene (HDPE).

A high density polyethylene having a density of 0.943 to 0.964 g/cm$^3$ can be used. Further, a high density polyethylene having a melting point of 128 to 136° C. can be used.

A straight-chain low density polyethylene is preferably used from the viewpoint of the heat resistance, and an ethylene-α-olefin copolymer obtained by a single site catalyst is more preferable. The molecular weight distribution of the ethylene-α-olefin copolymer obtained by the single site catalyst is strictly controlled, thus, the formation of tie molecules is promoted, and the toughness increased. The improvement of the sealing strength and the suppression of the generation of cracks becomes possible by the use of this kind of ethylene-α-olefin copolymer.

A propylene homopolymer, propylene-ethylene random copolymer, and a propylene-ethylene block copolymer may be included as the polypropylene-based resin. The polypropylene-based resins may be used singly or in a combination of two or more types.

Among the aforementioned polypropylene-based resins, the propylene-ethylene random copolymer is excellent in heat sealability at low temperatures compared to a propylene-ethylene block copolymer or a propylene homopolymer, and thus, can improve the heat sealing performance in which the electrolytic solution is involved. Further, the propylene-ethylene random copolymer has a low crystallinity, and thus, can suppress the volume change due to thermal shrinkage, in order to suppress the generation of cracks and improve the insulation properties after molding.

In the propylene-ethylene random copolymer, the ethylene content is preferably 0.1 to 10 mass %, more preferably 1 to 7 mass %, and even more preferably 2 to 5 mass %. If the ethylene content is 0.1 mass % or more, the melting point reduction effect can be sufficiently obtained by copolymerizing the ethylene, and the heat sealing performance in which the electrolytic solution is involved tends to be further improved. If the ethylene content is 10 mass % or less, the melting point can be prevented from decreasing too much, and the occurrence of hot melting (excess seal portion) in parts other than the seal part tends to be more sufficiently suppressed. Note that, the ethylene content can be measured by infrared spectrophotometry (IR spectroscopy) or nuclear magnetic resonance spectrometry ($^{13}$C-NMR spectroscopy and $^1$H-NMR spectroscopy) and the like.

The melting point of the propylene-ethylene random copolymer is preferably 120 to 145° C., and more preferably 125 to 140° C. If the melting point is 120° C. or more, the occurrence of the excess seal portion tends to be more sufficiently suppressed. If the melting point is 145° C. or less, the heat sealing performance in which the electrolytic solution is involved tends to be further improved.

It is preferable that the weight-average molecular weight of the propylene-ethylene random copolymer is appropriately adjusted so that the melting point is within the aforementioned range, but is preferably 10,000 to 10,000,000, and more preferably 100,000 to 1,000,000.

The propylene-ethylene random copolymer may be acid-modified, and may be, for example, an acid-modified propylene-ethylene random copolymer obtained by graft-modifying maleic anhydride. By using the acid-modified propylene-ethylene random copolymer, the adhesion with the tab leads can be maintained even without a tab sealant.

The content of the propylene-ethylene random copolymer in the sealant layer is preferably 50 to 95 mass % based on the total amount of components constituting the sealant layer, and more preferably 60 to 90 mass %.

From the viewpoint of obtaining the improvement effect of the degassing heat sealing strength, when the sealant layer comprises a polyethylene-based resin, the sealant layer may further comprise an incompatible elastomer which does not have compatibility with a compatible elastomer and/or the polyethylene-based resin which has compatibility with polyethylene-based resin. The compatible elastomer can suppress the generation of cracks to contribute to the improvement of the insulation properties after molding, and the incompatible elastomer can contribute to the improvement of the heat sealing performance in which the electrolytic solution including the degassing heat sealing strength is involved.

When the sealant layer comprises the propylene-ethylene random copolymer, the sealant layer may further comprise the incompatible elastomer which does not have compatibility with the compatible elastomer and/or the propylene-ethylene random copolymer which has compatibility with the propylene-ethylene random copolymer. The compatible elastomer can suppress the generation of cracks to contribute to the improvement of the insulation properties after molding, and the incompatible elastomer can contribute to the improvement of the heat sealing performance in which the electrolytic solution including the degassing heat sealing strength is involved.

The compatible elastomer and the incompatible elastomer will be described by dividing into the case when the sealant layer comprises a polyethylene-based resin and the case when the sealant layer contains a propylene-ethylene random copolymer.

(Case when the Sealant Layer Comprises the Polyethylene-Based Resin)

The compatible elastomer is an elastomer which has compatibility with the polyethylene-based resin. Herein, the term (compatible) which refers to having compatibility with a polyethylene-based resin means that the elastomer is dispersed within the polyethylene-based resin at a dispersed phase size of 1 nm or more to less than 200 nm. The term (incompatible) which refers to not having compatibility with a polyethylene-based resin means that the elastomer is dispersed within the polyethylene-based resin at a dispersed phase size of 200 nm or more.

Examples of the compatible elastomer include ethylene-α-olefin-based elastomers (for example, Tafiner manufactured by Mitsui Chemicals Inc. and Excellen manufactured by Sumitomo Chemical Co., Ltd.), ethylene-ethyl acrylate copolymers (for example, REXPEARL-EEA manufactured by Japan Polyethylene Corporation), styrene-based elastomers (for example, SEPTON manufactured by Kuraray Co., Ltd) and the like. The compatible elastomer may be used singly or in a combination of two or more types.

The incompatible elastomer is an elastomer which does not have compatibility with a polyethylene-based resin. Herein, (incompatible) which does not have compatibility with a polyethylene-based resin means that it is dispersed within the polyethylene-based resin at a dispersed phase size of 200 nm or more.

Examples of the incompatible elastomer include vinyl chloride-based elastomers, urethane-based elastomers, amide-based elastomers and the like. One of the incompatible elastomers may be used singly or in a combination of two or more types.

The compatible elastomer and the incompatible elastomer can have common copolymer components. As a combination of the compatible elastomer and the incompatible elastomer, the compatible elastomer is preferably ethylene-1-butene random copolymer, and the incompatible elastomer is preferably propylene-1-butene random copolymer, from the viewpoints of having an excellent affinity with the polyethylene-based resin, and further improving the affinity at the interface of a sea-island structure. In this case, the common copolymer component is 1-butene.

(Case when the Sealant Layer Comprises the Propylene-Ethylene Random Copolymer)

The compatible elastomer is an elastomer which has compatibility with the propylene-ethylene random copolymer. Herein, the term (compatible) which refers to having compatibility with a propylene-ethylene random copolymer means that the elastomer is dispersed within the propylene-ethylene random copolymer resin at a dispersed phase size of 1 nm or more to less than 200 nm. The term (incompatible) which refers to not having compatibility with a propylene-ethylene random copolymer means that the elastomer is dispersed within the propylene-ethylene random copolymer resin at a dispersed phase size 200 nm or more.

Examples of the compatible elastomer include propylene-based elastomers, hydrogenated styrene-based elastomers, ethylene-α-olefin-based (those having a high α-olefin carbon number, and a high α-olefin content) elastomers and the like. In an ethylene-α-olefin-based elastomer, the α-olefin carbon number is, for example, 4 or more, and the content of α-olefin is, for example, 35 mol % or more. Thereamong, a propylene-based elastomer and a hydrogenated styrene-based elastomer are preferable from the viewpoint that the affinity with the propylene-ethylene random copolymer is excellent. Examples of the propylene-based elastomer include Tafiner (manufactured by Mitsui Chemicals Inc.) which is a propylene-1-butene random copolymer, Notio (manufactured by Mitsui Chemicals Inc.) which is a nano crystalline structure controlled elastomer and the like. Further, examples of the hydrogenated styrene-based elastomer include Taftec (manufactured by Asahi Kasei Chemicals Corp.) and the like. The compatible elastomer may be used singly or in a combination of two or more types.

The melting point of the compatible elastomer is preferably 130° C. or less, more preferably 60 to 120° C., and even more preferably 65 to 90° C. from the viewpoint of improving the insulation properties after molding. By the melting point being 130° C. or less, the heat sealing performance in which the electrolytic solution is involved, specifically, the degassing heat sealing performance is further improved. Further, it is advantageous if the melting point is 60° C. or more, from the viewpoints of suppressing the generation of cracks, and further improving the insulation properties after molding.

The incompatible elastomer is an elastomer which does not have compatibility with a propylene-ethylene random copolymer. Herein, the term (incompatible) which refers to not having compatibility with a propylene-ethylene random copolymer component means that the elastomer is dispersed within the propylene-ethylene random copolymer resin at a dispersed phase size 200 nm or more.

Examples of the incompatible elastomer include styrene-based elastomers, ethylene-based elastomers, vinyl chloride-based elastomers, urethane-based elastomer, amide-based elastomers and the like. Thereamong, the ethylene-1-butene random copolymer and the styrene-based elastomer are preferable from the viewpoint of an excellent affinity with the compatible elastomer. Further, as the swelling due to the electrolytic solution is low, the ethylene 1-butene random copolymer (for example, Excellen (manufactured by Sumitomo Chemical Co., Ltd.)) is preferable. The incompatible elastomer may be used singly or in a combination of two or more types.

The melting point of the incompatible elastomer is preferably 130° C. or less, more preferably 60 to 120° C., and even more preferably 65 to 90° C. from the viewpoint of improving the insulation properties after molding and the heat sealing performance in which the electrolytic solution is involved. By the melting point being 130° C. or less, the heat sealing performance in which the electrolytic solution is involved, specifically, the degassing heat sealing strength, can be further improved. Further, it is advantageous if the melting point is 60° C. or more, from the viewpoints of suppressing the generation of cracks, and further improving the insulation properties after molding.

The compatible elastomer and the incompatible elastomer can have common copolymer components. As a combination of the compatible elastomer and the incompatible elastomer, the compatible elastomer is preferably propylene-1-butene random copolymer, and the incompatible elastomer is preferably ethylene-1-butene random copolymer, from the viewpoints of having an excellent affinity with the propylene-ethylene random copolymer, and further improving the affinity at the interface of a sea-island structure. In this case, the common copolymer component is 1-butene. Further, from the same viewpoints and from the viewpoint of alleviating stress such as during molding, the compatible elastomer is preferably a hydrogenated styrene-based elastomer, and the incompatible elastomer is preferably a styrene-based elastomer. In this case, the common copolymer component is styrene.

The total content of the compatible elastomer and/or the incompatible elastomer in the sealant layer is preferably 5 to 40 mass % based on the total amount of components constituting the sealant layer, more preferably 10 to 40 mass %, and even more preferably 15 to 40 mass %. By setting the total content to the aforementioned range, the generation of cracks can be suppressed and the insulation properties after molding can be improved, the reduction of the heat resistance of the sealant layer can be suppressed, and, the reduction of the sealing strength due to the electrolytic solution swelling and the reduction of the degassing heat sealing strength can be suppressed.

The mass ratio (the incompatible elastomer/the compatible elastomer) of the content of the incompatible elastomer in the compatible elastomer is preferably 0 to 1, more preferably 0.3 to 1, and even more preferably 0.5 to 1. By setting the mass ratio of the content to the aforementioned range, the generation of cracks can be suppressed, the insulation properties after molding can be improved, and, the degassing heat sealing strength can be further improved.

The presence of a copolymer component such as 1-butene or styrene in the sealant layer may be verified by expressing with Fourier Transform Infrared Spectrophotometer (FT-IR). Further, the content of the copolymer component can be verified using a resin composition formulated with a known amount of the elastomer containing a known amount of the copolymer component to create a calibration curve by the transmittance or the absorbance of the characteristic absorption band of the polyethylene-based resin or the propylene-ethylene random copolymer and the compatible elastomer. Furthermore, the content of the respective copolymer components of the compatible elastomer, and, the incompatible elastomer can also be verified by imaging in the characteristic absorption band of FT-IR in the same manner and mapping with the absorption band attributed to the copolymer component by microscopic FT-IR (transmission method). Note that, in addition to FT-IR, the presence and the content of the copolymer component may be verified by dissolving the sealant layer with a solvent and measuring with NMR.

A compound comprising at least one among the carboxyl group (—COOH) and the acid anhydride group (—CO—O—CO—) can be used as the compound having the anionic functional group. Specifically, fatty acids, ethylenediaminetetraacetic acid (EDTA), ethylene-methacrylic acid copolymer and maleic anhydride copolymer may be provided. Note that, in the present description, "(meth) acrylic acid" is used to mean acrylic acid and methacrylic acid.

Either an unsaturated fatty acid or a saturated fatty acid can be used as the fatty acid, and examples include oleic acid, linoleic acid, linolenic acid, myristic acid, lauric acid, palmitic acid, stearic acid, and arachidic acid. From the viewpoint of the compatibility, the fatty acid is preferably solid at room temperature (25° C.).

The maleic anhydride copolymer can comprise one or more types of monomer components from among ethylene, propylene, styrene, and (meth)acrylic alkyl ester as the copolymerization component of maleic anhydride. When the sealant layer 16 comprises a polyethylene-based resin, the maleic anhydride copolymer can comprise ethylene as the copolymerization component of maleic anhydride, and can further comprise one or more types of monomer components from among (meth)acrylic alkyl ester and styrene in accordance with need.

The compound having the anionic functional group may be used singly or in a combination of two or more types.

From the viewpoint of sufficiently obtaining the lithium ion capture effect, the concentration of the aforementioned anionic functional group in the anionic functional group-containing layer is preferably set to about 1.0 mass % or more based on the total amount of the components (entire mass of the anionic functional group-containing layer) (when the sealant layer is a single layer, the entire mass of the sealant layer) constituting the anionic functional group-containing layer.

When the sealant layer 16 comprises the polypropylene-based resin, the concentration of the aforementioned anionic functional group is preferably about 1.0 mass % or more from the viewpoint of achieving both the lithium ion capture effect and the sealing properties such as the sealing strength and the lamination strength which exerts an influence on the compatibility with the polypropylene-based resin, and the upper limit is preferably a concentration which does not cause a phase transition of the polypropylene-based resin.

When the sealant layer 16 comprises the polyethylene-based resin, the concentration of the aforementioned anionic functional group is preferably about 1.0 to 10.0 mass %, more preferably 3.0 to 8.0 mass %, and even more preferably 3.0 to 6.0 mass %, from the viewpoint of achieving both the lithium ion capture effect and the heat sealing strength.

When the concentration of the anionic functional group in the anionic functional group-containing layer satisfies the aforementioned conditions, it is possible to suppress the reduction of the heat sealing strength, the degassing heat sealing strength, and blushing during molding, while sufficiently suppressing the reduction of the insulation properties after molding. By setting the concentration of the anionic functional group to the aforementioned range, it is easy to obtain the aforementioned results, even in a configuration in which, for example, the total thickness of the inner layer side compared to the metal foil layer is 35 µm or less, and specifically, in which the total thickness of the sealant layer is 30 µm or less.

Note that, the concentration of the anionic functional group can be obtained according to the following formula from the molecular weight and the content of the compound having the anionic functional group and the molecular weight of the anionic functional group.

> The concentration (mass %) of the anionic functional group={(molecular weight of the anionic functional group)/(molecular weight of the compound having the anionic functional group)}×(content ratio (mass %) of the compound having the anionic functional group in the anionic functional group-containing layer).

When the compound having the anionic functional group is a copolymer, the concentration can be obtained according to the following formula from the content ratio (mass %) of the monomer component having the anionic functional group in the copolymer, the molecular weight of the anionic functional group, and the molecular weight of the monomer component having the anionic functional group.

> The concentration (mass %) of the anionic functional group=[{(molecular weight of the anionic functional group)/(molecular weight of the monomer component having the anionic functional group)}×(content ratio (mass %) of the monomer component having the anionic functional group in the copolymer)]×(content ratio (mass %) of the copolymer in the anionic functional group-containing layer)

Note that, when the copolymer contains a monomer component having a plurality of anionic functional groups, the aforementioned calculation can be performed for each monomer component, and the concentration of the anionic functional group can be obtained from the total of these calculations.

When the anionic functional group-containing layer contains a plurality of compounds having the anionic functional group, the aforementioned calculation can be performed for each compound having the anionic functional group, and the concentration of the anionic functional group can be obtained from the total of these calculations.

As another method, the concentration of the anionic functional group can be verified by a method in which the layer to be measured or its cross section is analyzed by ATR or microscopic IR. In this case, the concentration can be calculated by measuring a standard sample of a known concentration and using the calibration curve prepared from the obtained peak strength and the target component concentration thereof.

When the sealant layer 16 comprises the polyethylene-based resin, the anionic functional group-containing layer is preferably comprised of a polyethylene-based resin as the compound having the anionic functional group, and a copolymer comprising ethylene as the copolymer component. Examples of this kind of copolymer include ethylene-methacrylic acid copolymers, ethylene-(meth)acrylic alkyl ester-maleic anhydride copolymers and the like. When the compound having the anionic functional group is the aforementioned ethylene-based compound, it is possible to maintain a good compatibility state in the anionic functional group-containing layer comprising a polyethylene-based resin, and effects such as (1) the amount of addition can be increased since phase transition hardly occurs and the reduction of the insulating property after molding can be more reliably suppressed, (2) the dispersion state within the anionic functional group-containing layer becomes good, and the reduction of the insulation properties after forming can be more reliably suppressed, and (3) the micro cracks occurring at the interface between the compatible and the incompatible states can be suppressed can be obtained.

The sealant layer may contain components other than the aforementioned components. Other resins such as low density polyethylene (LDPE) may be added as other components to improve, for example, the take-off properties and the processability. The content of the other resin components to be added is preferably 10 mass % or less based on the total amount of the sealant layer. Further, examples of components other than the resin include a slipping agent, anti-blocking agent, antioxidant, hindered amine light stabilizer, flame retardant and the like. The content of the other components other than these resins is preferably 5 mass % or less based on the total amount of the sealant layer.

The thickness of the sealant layer 16 is not specifically limited, but specifically, is preferably in the range of 5 to 100 μm, and more preferably in the range of 10 to 60 μm.

In the present embodiment, from the viewpoint of thinning, the thickness of the sealant layer may be 30 μm or less. The exterior material for the lithium ion battery of the present embodiment can suppress the reduction of the insulation properties after molding, even with such a thin film configuration.

As stated above, a preferred embodiment of the exterior material for the lithium ion battery of the present embodiment has been described in detail. However, the present invention should not be construed as being limited to such a specific embodiment, but may be variously modified and changed within the range of the spirit of the present invention recited in claims.

For example, FIG. 1 shows the case when the corrosion prevention treatment layer 14 has been formed on the surface of the adhesive resin layer 15 side of the metal foil layer 13, but the corrosion prevention treatment layer 14 may also be formed on the surface of the first adhesive layer 12 side of the metal foil layer 13, and may also be formed on both surfaces of the metal foil layer 13. When the corrosion prevention treatment layer 14 is formed both surfaces of the metal foil layer 13, the configuration of the corrosion prevention treatment layer 14 formed on the first adhesive layer 12 side of the metal foil layer 13 and the configuration of the corrosion prevention treatment layer 14 formed on the adhesive resin layer 15 side of the metal foil layer 13 may be the same or different.

Figure 2:
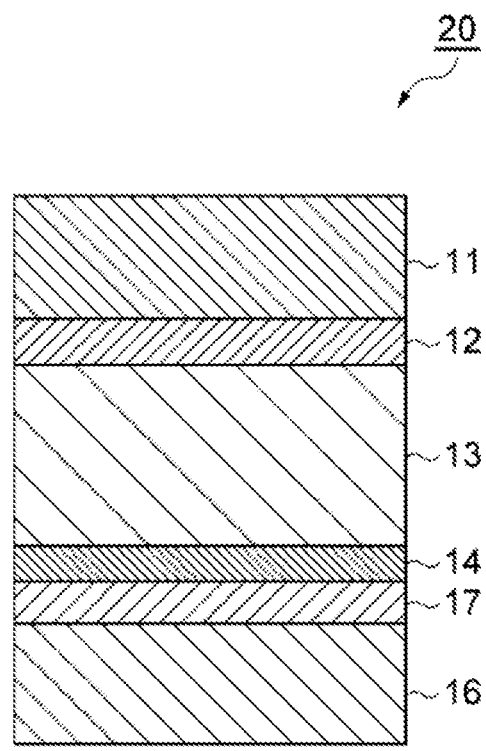
FIG. 2 is a schematic sectional view of the exterior material for the lithium ion battery according to an embodiment of the present invention.

Further, FIG. 1 shows the case when the adhesive resin layer 15 is used to laminate the metal foil layer 13 with the sealant layer 16, but the second adhesive layer 17 may also be used to laminate the metal foil layer 13 and the sealant layer 16 as in the case of the exterior material 20 for the lithium ion battery shown in FIG. 2. The second adhesive layer 17 will be described below.

<Second Adhesive Layer 17>

The second adhesive layer 17 is the layer for adhering the metal foil layer 13 on which the corrosion prevention treatment layer 14 was formed with the sealant layer 16. A general adhesive for adhering the metal foil layer with the sealant layer can be used in the second adhesive layer 17.

When the corrosion prevention treatment layer 14 has a layer containing at least one polymer selected from the group consisting of the aforementioned cationic polymer and anionic polymers, the second adhesive layer 17 is preferably a layer containing a compound (hereinafter, referred to as the "reactive compound") which is reactive with the polymer contained in the corrosion prevention treatment layer 14.

For example, when the corrosion prevention treatment layer 14 contains a cationic polymer, the second adhesive layer 17 contains a compound having reactivity with the cationic polymer. When the corrosion prevention treatment layer 14 contains an anionic polymer, the second adhesive layer 17 contains a compound having reactivity with the anionic polymer. Further, when the corrosion prevention treatment layer 14 contains a cationic polymer and an anionic polymer, the second adhesive layer 17 contains a compound having reactivity with the cationic polymer and a compound having reactivity with the anionic polymer. However, it is not always necessary that the second adhesive layer 17 contains the two types of compounds, and both of the cationic polymer and the compound having reactivity with the anionic polymer may be included. The expression "having reactivity" means forming a covalent bond with a cationic polymer or an anionic polymer. Further, the second adhesive layer 17 may further include the acid-modified polyolefin resin.

The compound having reactivity with the cationic polymer includes at least one compound selected from the group consisting of the polyfunctional isocyanate compound, the glycidyl compound, the compound having a carboxyl group, and the compound having an oxazoline group.

Examples of these polyfunctional isocyanate compounds, the glycidyl compounds, the compounds having a carboxyl group, the compounds having an oxazoline group include the polyfunctional isocyanate compound, the glycidyl compound, the compound having a carboxyl group, the compound having an oxazoline group and the like exemplified above as a crosslinking agent for making the cationic polymer the crosslinked structure. Among these compounds, a polyfunctional isocyanate compound is preferable in that the reactivity with cationic polymers is high, and the crosslinked structure forms relatively easily.

Examples of the compound having reactivity with the anionic polymer include at least one compound selected from the group consisting of the glycidyl compound and compounds having an oxazoline group. These glycidyl compounds, compounds having an oxazoline group include the glycidyl compound and compounds having an oxazoline group and the like exemplified above as the crosslinking agents for making the cationic polymer to the crosslinked structure. Among these compounds, the glycidyl compound is preferable in that the reactivity with the anionic polymer is high.

When the second adhesive layer 17 contains the acid-modified polyolefin resin, the reactive compound preferably has reactivity with the acid group in the acid-modified polyolefin resin (i.e., forms a covalent bond with an acid group). Therefore, the adhesion with the corrosion prevention treatment layer 14 further increases. In addition, the acid-modified polyolefin resin becomes the crosslinked structure, and the solvent resistance of the exterior material 20 further improves.

The content of the reactive compound is preferably an amount equivalent to 10 times the amount relative to the acid group within the acid-modified polyolefin resin. If the contents are equivalent or more, the reactive compound reacts sufficiently with the acid group within the acid-modified polyolefin resin. On the one hand, if the amount is in excess of 10 times, the crosslinking reaction with the acid-modified polyolefin resin becomes sufficiently saturated, thus, unreacted substances are present and the reduction of various performances is of concern.

The acid-modified polyolefin resin is a compound in which an acid group was introduced into a polyolefin resin. Examples of the acid group include carboxyl group, sulfonic acid group and the like, and carboxyl group is especially preferable. The same compounds as those exemplified as the modified polyolefin resin (a) used in the adhesive resin layer 15 can be used as the acid-modified polyolefin resin.

Various additives, such as a flame retardant, slipping agent, anti-blocking agent, antioxidant, hindered amine light stabilizer, and a tackifier may be blended in the second adhesive layer 17.

Note that, there are cases when a silane coupling agent is included in a general adhesive used to adhere a metal foil layer with the sealant layer. The inclusion of the silane coupling agent promotes adhesion by formulating a silane coupling agent, and increases the adhesion strength. However, if an adhesive formulated with a silane coupling agent is used, there is the risk that, depending on the types of functional groups contained in the silane coupling agent, a side reaction will occur between components other than the silane coupling agent contained in the adhesive layer and the silane coupling agent, and an adverse effect is produced in the crosslinking reaction which is the original object. Therefore, the adhesive used in order to adhere the metal foil layer with the sealant layer preferably does not contain a silane coupling agent.

By the second adhesive layer 17 containing the aforementioned reactive compound, a covalent bond is formed with the polymer within the corrosion prevention treatment layer 14, and the adhesion strength between the corrosion prevention treatment layer 14 and the second adhesive layer 17 improves. Therefore, it is not necessary to formulate a silane coupling agent in the second adhesive layer 17 for the purpose of promoting adhesion, and the second adhesive layer 17 preferably does not contain a silane coupling agent.

The thickness of the second adhesive layer 17 is not specifically limited, but is preferably 1 to 10 μm, and more preferably 3 to 7 μm from the viewpoints of obtaining the desired adhesion strength, processability and the like.

The configuration of the exterior material 20 for the lithium ion battery other than the second adhesive layer 17 is the same as the exterior material 10 for the lithium ion battery. Note that, the thickness of the sealant layer 16 in the exterior material 20 for the lithium ion battery is adjusted in accordance with the thickness of the second adhesive layer 17. The thickness of the sealant layer 16 in the exterior material 20 for the lithium ion battery is not specifically limited, but is preferably in the range of 5 to 100 μm, and more preferably in the range of 20 to 80 μm.

Even in the exterior material 20 for the lithium ion battery, the thickness of the sealant layer may be 30 μm or less from the viewpoint of thinning. The exterior material for the lithium ion battery of the present embodiment can suppress the reduction of the insulation properties after molding even with such a thin film configuration.

Further, FIG. 1 and FIG. 2 show the case when the sealant layer 16 has been formed from a single layer, but the sealant layer 16 may be formed from a multilayer of two or more layers. The configuration of the respective layers of the multilayer forming the sealant layer 16 may be the same or different.

When the sealant layer is formed from a multilayer, at least one layer thereamong is the anionic functional group-containing layer which contains a compound having the anionic functional group, or, is the anionic functional group-containing layer containing a resin such as a polyethylene-based resin or a polypropylene-based resin and a compound having the anionic functional group, but in the present embodiment, at least one layer other than the layer furthest from the metal foil layer among the plurality of layers constituting the sealant layer is preferably the anionic functional group-containing layer.

Further, the layer (the innermost layer of the sealant layer) furthest from the metal foil layer among the plurality of layers constituting the sealant layer is preferably (1) a layer comprising the propylene-ethylene random copolymer, and, which does not comprise the compatible elastomer and the incompatible elastomer, or, (2) a layer comprising the propylene-ethylene random copolymer and the compatible elastomer. In this case, by further suppressing the generation of cracks during cold molding in the innermost layer of the sealant layer, the permeation of the electrolytic solution to the metal foil layer side can be further suppressed, and the insulation properties after molding can be further improved. The same compounds as previously stated can be used as the propylene-ethylene random copolymer, the compatible elastomer and the incompatible elastomer in the innermost layer of the sealant layer of the multilayer structure.

A layer comprising a propylene-ethylene random copolymer is preferable as the aforementioned (1) layer. A layer comprising the propylene-ethylene random copolymer and the compatible elastomer, and, which does not comprise the incompatible elastomer is preferable as the aforementioned (2) layer.

When the sealant layer 16 comprises the polyethylene-based resin, the layer (innermost layer of the sealant layer) furthest from the metal foil layer among the plurality of layers constituting the sealant layer is preferably a layer containing the ethylene-α-olefin copolymer. In this case, by further suppressing the generation of cracks during cold molding in the innermost layer of the sealant layer, the permeation of the electrolytic solution to the metal foil layer side can be further suppressed, and the insulation properties after molding can be further improved. The same compounds as previously stated can be used as the ethylene-α-olefin copolymer in the innermost layer of the sealant layer of the multilayer structure.

Figure 3:
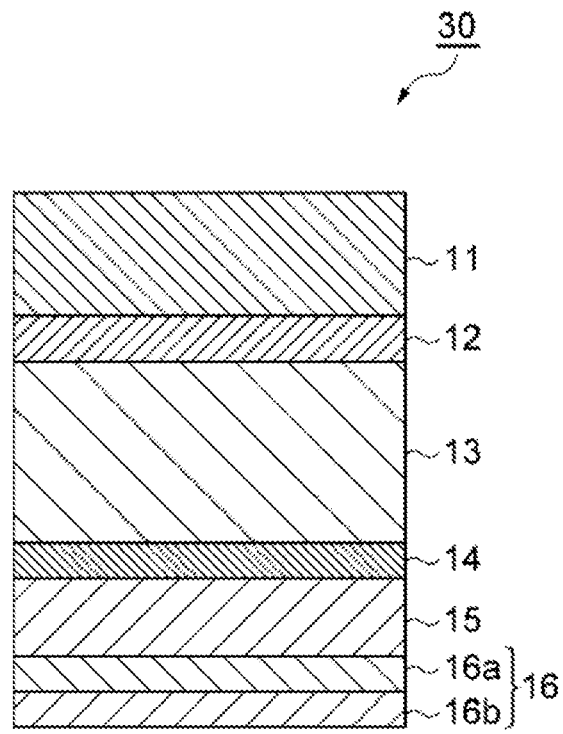
FIG. 3 is a schematic sectional view of the exterior material for the lithium ion battery according to an embodiment of the present invention.

When the sealant layer 16 is formed from two layers, the sealant layer 16 can include the first sealant layer 16a of the metal foil layer 13 side, and, the second sealant layer 16b which is the innermost layer of the sealant layer 16 as in the case of the exterior material 30 for the lithium ion battery shown in FIG. 3.

In the present embodiment, the first sealant layer 16a is preferably the anionic functional group-containing layer. The anionic functional group-containing layer can use the same compounds as previously stated. The second sealant layer 16b is preferably a layer comprising the aforementioned (1) layer, the aforementioned (2) layer, or the ethylene-α-olefin copolymer. In this case, the thickness of the second sealant layer 16b is not specifically limited, but is preferably 50% or less of the thickness of the sealant layer 16.

When a compound having the anionic functional group has a low compatibility with a polypropylene-based resin, if a compound having an anionic functional group is formulated on the innermost layer of the sealant layer, cracks and blushing tend to easily occur during molding. Further, since the innermost layer of the sealant layer is susceptible to the cohesive force of the seal, it tends to be difficult to secure the burst strength of the seal. Furthermore, if a compound having an anionic functional group is present in the innermost layer of the sealant layer, there is the possibility that the lithium ions contained in the electrolytic solution may be captured and the battery performance is decreased. By providing the anionic functional group-containing layer other than on the innermost layer of the sealant layer, the insulation properties after molding can be sufficiently maintained while solving the abovementioned concern.

The configuration of the exterior material 30 for the lithium ion battery other than the first sealant layer 16a and the second sealant layer 16b is the same as the exterior material 10 for the lithium ion battery.

Even in the exterior material 30 for the lithium ion battery, the total thickness of the sealant layer may be 30 μm or less from the viewpoint of thinning. The exterior material for the lithium ion battery of the present embodiment can suppress the reduction of the insulation properties after molding even with such a thin-film configuration.

FIG. 1, FIG. 2 and FIG. 3 show the case when the substrate layer 11 is adhered with the metal foil layer 13 through the first adhesive layer 12, but the substrate layer 11 may also be formed directly on the metal foil layer 13 by a coating method without the first adhesive layer 12 being interposed therebetween. In the present description, the substrate layer directly formed on the metal foil layer 13 by a coating method in this manner is referred to as the coating layer. Note that, the corrosion prevention treatment layer 14 may be formed on the surface of the coating layer side of the metal foil layer 13. The coating layer will be described below.

<Coating Layer>

The coating layer fulfills the role of imparting heat resistance in the sealing step during production of a lithium ion battery and inhibiting the formation of pinholes that can occur during processing and distribution.

The coating layer is formed from a resin, and is directly formed on one surface of the metal foil layer 13 without an adhesive layer or the like being interposed therebetween. Such a coating layer may be formed by coating a resin material to become the coating layer on the metal foil layer 13.

Polyester, fluororesin, acrylic resin and the like may be used as the resin material for forming the coating layer, and thereamong, urethane acrylate is preferable. This is because the coating film made of urethane acrylate has a suitable ductility and malleability. A two-part curing type coating liquid may be used as a coating liquid containing these resin materials.

The thickness of the coating layer is preferably 3 μm to 30 μm, and more preferably 5 μm to 20 μm. The coating layer is formed directly on the metal foil layer 13; thus, it is easy to produce a configuration which is thinner than the conventional exterior material by setting the thickness of the coating layer to 20 μm or less.

As shown in the aforementioned embodiment, the adhesive layer may be provided in the laminate between the sealant layer and the metal foil layer/the corrosion prevention treatment layer, and the adhesive resin layer may be provided on the side closest to the metal foil layer of the sealant layer for improving the adhesion between the metal foil layer and the corrosion prevention treatment layer by making the sealant layer to a multilayer. The adhesive resin layer at this time may be the anionic functional group-containing layer. A compound having the anionic functional group can be comprised in the adhesive resin layer as the anionic functional group-containing layer in the same manner as stated above, and the concentration of the anionic functional group can also be made in the same manner as stated above. The same composition as stated above can also be used for the adhesive resin composition constituting the adhesive resin layer.

[Method for Manufacturing the Exterior Material]

Next, the method for manufacturing the exterior material 10 shown in FIG. 1 will be described. Note that, the method for manufacturing the exterior material 10 is not limited to the following method.

The method for manufacturing the exterior material 10 of the present embodiment roughly includes a step of laminating a corrosion prevention treatment layer 14 to a metal foil layer 13, a step of bonding a substrate layer 11 with the metal foil layer 13, a step of further laminating an adhesive resin layer 15 and a sealant layer 16 to produce a laminate, and a step of heat treating the obtained laminate in accordance with need.

(Step of Laminating the Corrosion Prevention Treatment Layer 14 to the Metal Foil Layer 13)

The present step is a step for forming the corrosion prevention treatment layer 14 on the metal foil layer 13. Examples of the method include, as stated above, subjecting the metal foil layer 13 to a degreasing treatment, hydrothermal modification treatment, anodization, or chemical conversion treatment, and coating the metal foil layer 13 with a coating agent having the corrosion prevention performance.

Further, when the corrosion prevention treatment layer 14 is a multilayer, for example, the coating liquid (coating agent) for producing the corrosion prevention treatment layer of a lower layer side (the metal foil layer 13 side) is coated on the metal foil layer 13 and baked to form the first layer, and then, the coating liquid (coating agent) for producing the corrosion prevention treatment layer of an upper layer side is coated on the first layer and baked to form the second layer. Further, the second layer can be formed in the step of laminating the adhesive resin layer 15 and the sealant layer 16 which will be described below.

The degreasing treatment may be carried out by spraying and immersion, the hydrothermal modification treatment and the anodization may be carried out by immersion, and chemical conversion treatment can be selected from among immersion, spraying and coating corresponding to the type of chemical conversion treatment.

Various methods such as gravure coating, reverse coating, roll coating or bar coating can be employed as the method for coating the coating agent having corrosion prevention performance.

As stated above, either both sides or one side of the aluminum foil may be subjected to the treatments, but when one side is subjected to the treatments, the treatment surface is the surface which is laminated with the adhesive resin layer 15. Note that, the surface of the substrate layer 11 may be subjected to the aforementioned treatments in accordance with need.

Further, the coating amount of the coating agents for forming the first layer and the second layer is preferably 0.005 to 0.200 $g/m^2$, and more preferably 0.010 to 0.100 $g/m^2$.

Further, in the case when curing is necessary, curing can be performed in the range of 60 to 300° C. as the base material temperature in accordance with the drying conditions of the corrosion prevention treatment layer 14 to be used.

(Step of Bonding the Substrate Layer 11 and the Metal Foil Layer 13)

In the present step, the metal foil layer 13 provided with the corrosion prevention treatment layer 14 is bonded to the substrate layer 11 through the first adhesive layer 12. The bonding method uses a technique such as dry lamination, non-solvent lamination or wet lamination, and bonds the metal foil layer 13 provided with the corrosion prevention treatment layer 14 to the substrate layer 11 using the material forming the aforementioned first adhesive layer 12. The first adhesive layer 12 is provided in a dry coating amount in the range of 1 to 10 $g/m^2$, and more preferably a coating amount in the range of 3 to 7 $g/m^2$.

(Step of Laminating the Adhesive Resin Layer 15 and the Sealant Layer 16)

In the present step, the adhesive resin layer 15 and the sealant layer 16 are formed on the corrosion prevention treatment layer 14 that has been formed in the previous steps. The method includes using an extrusion laminator to sandwich-laminate the adhesive resin layer 15 and the sealant layer 16 together. Furthermore, it is possible to laminate by a tandem lamination method or a co-extrusion method which extrudes the adhesive resin layer 15 with the sealant layer 16. The resin composition for sealant layer formation can be prepared with a resin such as a polyethylene-based resin or a polypropylene-based resin, a compound having the anionic functional group, or other components in accordance with need, in order to satisfy the composition of the aforementioned anionic functional group-containing layer.

As shown in FIG. 1, through this step, a laminate can be obtained in which each layer is laminated in the sequence of the substrate layer 11/the first adhesive layer 12/the metal foil layer 13/the corrosion prevention treatment layer 14/the adhesive resin layer 15/the sealant layer 16.

Note that, the adhesive resin layer 15 may be laminated with materials that are dry-blended so as to have a composition of the material formulation mentioned above may be directly laminated with an extrusion laminator, or a granulated adhesive resin layer 15 obtained by melt-blending the materials using a melt blending device such as a single-screw extruder, twin-screw extruder or Brabender mixer in advance may be laminated with an extrusion laminator.

When laminating the sealant layer 16, materials that are dry-blended so as to have a composition of the material formulation mentioned above as the resin composition for sealant layer formation may be directly laminated with an extrusion laminator, or a granulated material obtained by melt-blending the materials using a melt blending device such as a single-screw extruder, twin-screw extruder or Brabender mixer in advance may be laminated by a tandem method or a co-extrusion method which extrudes the adhesive resin layer 15 and the sealant layer 16 with an extrusion laminator. Further, the sealant layer 16 may be laminated by a method which uses the resin composition for sealant layer formation to produce a sealant single film as a cast film in advance, and sandwich-laminating the film with the adhesive resin, or may be laminated by a dry lamination method using the adhesive.

Further, when forming the multilayer corrosion prevention treatment layer 14, if the extrusion laminator has a unit capable of applying an anchor coating, the second corrosion prevention treatment layer 14 may be coated by the unit.

(Heat Treatment Step)

In the present step, the laminate is heat treated. By heat treating the laminate, the adhesion between the metal foil layer 13/the corrosion prevention treatment layer 14/the adhesive resin layer 15/the sealant layer 16 improves, and a more superior electrolytic solution resistance and hydrofluoric acid resistance can be imparted, and, an effect which suppresses the crystallization of the adhesive resin layer 15 and the sealant layer 16 and improves the insulation properties after molding can be obtained. Therefore, in the present step, it is preferable to improve the adhesion between each of the aforementioned layers and perform a heat treatment suitable for the crystallization of the adhesive resin layer 15 and the sealant layer 16.

With respect thereto, the exterior material 10 according to the present embodiment can be produced as shown in FIG. 1.

Next, a method for manufacturing the exterior material 20 shown in FIG. 2 will be described below. Note that, the method for manufacturing the exterior material 20 is not limited to the following method.

The method for manufacturing the exterior material 20 of the present embodiment roughly includes a step of laminating a corrosion prevention treatment layer 14 to the metal foil layer 13, a step of bonding the substrate layer 11 with the metal foil layer 13, a step of further laminating the sealant layer 16 through the second adhesive layer 17 to produce a laminate, and a step of performing an aging treatment to the obtained laminate in accordance with need. Note that the steps until the bonding of the substrate layer 11 with the metal foil layer 13 can be performed in the same manner as the aforementioned method for manufacturing the exterior material 10.

(Step of Laminating the Second Adhesive Layer 17 and the Sealant Layer 16)

The present step is the step for bonding the sealant layer 16 to the corrosion prevention treatment layer 14 side of the metal foil layer 13 through the second adhesive layer 17. The method for bonding includes a wet process, dry lamination and the like.

In the case of a wet process, a solution or dispersion of the adhesive constituting the second adhesive layer 17 is coated onto the corrosion prevention treatment layer 14, the solvent is volatilized at the desired temperature (when the adhesive contains an acid-modified polyolefin resin, a temperature not less than the melting point), and baked. Then, the sealant layer 16 is laminated and the exterior material 20 is produced. The coating method includes the various coating methods exemplified above.

(Aging Treatment Step)

In the present step, the laminate is subjected to an aging (curing) treatment. By subjecting the laminate to the aging treatment, the adhesion between the metal foil layer 13/the corrosion prevention treatment layer 14/the second adhesive layer 17/the sealant layer 16 can be promoted. The aging treatment can be performed at a range from room temperature to 100° C. The aging time is, for example, 1 to 10 days.

With respect thereto, the exterior material 20 according to the present embodiment can be produced as shown in FIG. 2.

Next, a method for manufacturing the exterior material 30 shown in FIG. 3 will be described below. Note that, the method for manufacturing the exterior material 30 is not limited to the following method.

The method for manufacturing the exterior material 30 of the present embodiment roughly includes a step of laminating the corrosion prevention treatment layer 14 to the metal foil layer 13, a step of bonding a substrate layer 11 with the metal foil layer 13, a step of further laminating the adhesive resin layer 15, the first sealant layer 16a and the second sealant layer 16b to produce a laminate, and a step of heat treating the obtained laminate in accordance with need.

(Step of Laminating the Adhesive Resin Layer 15, the First Sealant Layer 16a and the Second Sealant Layer 16b)

The present step is a step for forming the adhesive resin layer 15, the first sealant layer 16a and the second sealant layer 16b on the corrosion prevention treatment layer 14. The method includes a tandem method or a co-extrusion method which extrudes the adhesive resin layer 15 and the first sealant layer 16a and the second sealant layer 16b with an extrusion laminator. In this case, the materials that are dry-blended so as to have a composition of the material formulation mentioned above as the resin composition for sealant layer formation may be directly laminated with an extrusion laminator, or the granulated material obtained by melt-blending the materials using a melt blending device such as a single-screw extruder, twin-screw extruder or Brabender mixer in advance may be laminated by the tandem method or the co-extrusion method which extrudes the adhesive resin layer 15 and the first sealant layer 16a and the second sealant layer 16b with an extrusion laminator.

The first sealant layer 16a and the second sealant layer 16b may be laminated by a method for forming a film by co-extrusion and sandwich-laminating these films with the adhesive resin, or may be laminated by a dry lamination method using the adhesive.

With respect thereto, the exterior material 30 according to the present embodiment can be produced as shown in FIG. 3.

As stated above, a preferred embodiment of the exterior material for the lithium ion battery of the present invention and the method for the manufacture thereof has been described in detail. However, the present invention should not be construed as being limited to such a specific embodiment, but may be variously modified and changed within the range of the spirit of the present invention recited in claims. Note that, when producing the exterior material for the lithium ion battery provided with a coating layer in place of the substrate layer 11 and the first adhesive layer 12, the coating layer can be formed, as stated above, by coating the resin material which is the coating layer on the metal foil layer 13.

EXAMPLES

In the following, the present invention will be described in more detail based on examples. However, the present invention should not be limited to the following examples.

[Materials Esed]

The materials used in Examples A1 to A12 and Comparative Examples A1 to A5 are as follows.

<Substrate Layer (Thickness of 12 μm)>

Nylon film (Ny) (manufactured by Toyobo Co., Ltd.) was used.

<First Adhesive Layer (Thickness of 4 μm)>

A polyurethane-based adhesive incorporating a tolylene diisocyanate adduct-based curing agent in the polyether polyol-based main agent (manufactured by Toyo Ink Co., Ltd.) was used.

<First corrosion prevention treatment layer (substrate layer side)>

(CL-1): A "sodium polyphosphate-stabilized cerium oxide sol" adjusted to a solid concentration of 10 mass % using distilled water for the solvent was used. Note that, the sodium polyphosphate-stabilized cerium oxide sol was obtained by formulating 10 parts by mass of phosphate per 100 parts by mass of cerium oxide.

(CL-2): A composition comprising 90 mass % of "polyallylamine (manufactured by Nitto Boseki Co., Ltd)" and 10 mass % of "polyglycerol polyglycidyl ether (manufactured by Nagase Chemtex Corp.)" adjusted to a solid concentration of 5 mass % using distilled water was used for the solvent.

(CL-3): A chemical conversion treatment agent prepared by adding chromium fluoride (CrF3) to a water-soluble phenol resin (Sumitomo Bakelite Co., Ltd.) was adjusted to a solid concentration of 1 mass % using an aqueous phosphoric acid solution having a concentration of 1 mass % as the solvent, and the concentration was adjusted to 10 mg/m$^2$ as the amount of Cr present in the final dry coating was used.

<Metal Foil Layer (Thickness of 35 μm)>

Annealed and degreased soft aluminum foil ("8079" manufactured by Toyo Aluminum K.K.) was used.

<Second Corrosion Prevention Treatment Layer (Sealant Layer Side)>

(CL-1): A "sodium polyphosphate-stabilized cerium oxide sol" adjusted to a solid concentration of 10 mass % using distilled water for the solvent was used. Note that, the sodium polyphosphate-stabilized cerium oxide sol was obtained by formulating 10 parts by mass of phosphate per 100 parts by mass of cerium oxide.

(CL-2): A composition comprising 90 mass % of "polyallylamine (manufactured by Nitto Boseki Co., Ltd)" and 10 mass % of "polyglycerol polyglycidyl ether (manufactured by Nagase Chemtex Corp.)" adjusted to a solid concentration of 5 mass % using distilled water was used for the solvent.

(CL-3): A chemical conversion treatment agent prepared by adding chromium fluoride (CrF3) to a water-soluble phenol resin (Sumitomo Bakelite Co., Ltd.) was adjusted to a solid concentration of 1 mass % using an aqueous phosphoric acid solution having a concentration of 1 mass % as the solvent, and the concentration was adjusted to 10 mg/m2 as the amount of Cr present in the final dry coating was used.

<Adhesive Resin Layer>

A mixture of the following materials was mixed and used in a mass ratio such that AR-1:AR-2:AR-3=3:1:1.

(AR-1): An acid-modified polypropylene resin composition (manufactured by Mitsui Chemicals Inc.) of a random polypropylene (PP) base formulated with an ethylene-propylene rubber as an incompatible rubber was used. (AR-2): A polypropylene or propylene-α-olefin copolymer having an atactic structure ("Tafthren H" manufactured by Sumitomo Chemical Co., Ltd.) was used.

(AR-3): A propylene-α-olefin copolymer having an isotactic structure ("Tafiner-XM" manufactured by Mitsui Chemicals Inc.) was used.

<Second Adhesive Layer (thickness of 3 μm)>

An adhesive prepared by formulating 10 parts by mass (solid content ratio) of a polyisocyanate compound having an isocyanurate structure in 100 parts by mass of maleic anhydride-modified polyolefin resin dissolved in toluene was used.

<Sealant Layer>

The resin compositions (SL-1 to SL-10) in which each component shown in the following Table 1 was mixed at the formulation amounts (units: parts by mass) shown in the same table were used. Note that the details of each component are shown below.

Polypropylene-based resin: a propylene-ethylene random copolymer ("Prime Polypro" manufactured by Prime Polymer Co., Ltd.) having a melting point of 140° C.

Compatible elastomer: a propylene-butene-1 random copolymer elastomer ("Tafiner-XM" manufactured by Mitsui Chemicals Inc.) having a melting point of 75° C.

Ethylene-methacrylic acid copolymer: formulation ratio of 15 mass % methacrylic acid ("Nucrel" manufactured by Dupont) relative to the total amount of polymerization components Oleic acid: manufactured by NOF Corporation Ethylene-ethyl acrylate-maleic anhydride copolymer: formulation ratio of 3 mass % maleic anhydride (manufactured by Japan Polyethylene Corporation, "REXPEARL-ET") relative to the total amount of polymerization components Ethylene-ethyl acrylate copolymer: formulation ratio of 20 mass % ethyl acrylate (manufactured by Japan Polyethylene Corporation, "REXPEARL-EEA") relative to the total amount of polymerization components Note that, the concentration of the anionic functional group was calculated by the following procedure.

The concentration of the anionic functional group was obtained according to the following formula for SL-7 and SL-8.

The concentration (mass %) of the anionic functional group={(molecular weight of the carboxyl group)/(molecular weight of the oleic acid)}×(content ratio (mass %) of the oleic acid in the anionic functional group-containing layer)

The concentration of the anionic functional group was obtained according to the following formula for SL-3 to 6.

The concentration (mass %) of the anionic functional group=[{(molecular weight of the carboxyl group)/(molecular weight of the methacrylic acid)}×(content ratio (mass %) of the methacrylic acid in the copolymer)]×(content ratio (mass %) of the copolymer in the anionic functional group-containing layer)

The concentration of the anionic functional group was obtained according to the following formula for SL-9 and 10.

The concentration (mass %) of the anionic functional group=[{(molecular weight of the acid anhydride group (—CO—O—CO—))/(molecular weight of the maleic anhydride)}×(the content ratio (mass %) of maleic anhydride in the copolymer)]×(content ratio (mass %) of the copolymer in the anionic functional group-containing layer)

TABLE 1

| | Polypropylene-based resin | Compatible elastomer | Ethylene-methacrylate copolymer | Oleic acid | Ethylene-ethyl acrylate-maleic anhydride copolymer | Ethylene-ethyl-acrylate copolymer | Concentration of anionic functional group in resin composition (mass %) |
|---|---|---|---|---|---|---|---|
| SL-1 | 100 | 0 | — | — | — | — | 0 |
| SL-2 | 80 | 20 | — | — | — | — | 0 |
| SL-3 | 99 | — | 1 | — | — | — | 0.1 |
| SL-4 | 65 | — | 25 | — | — | — | 2.0 |
| SL-5 | 50 | — | 55 | — | — | — | 4.3 |
| SL-6 | 90 | — | — | 7 | — | — | 1.1 |
| SL-7 | 85 | — | — | 15 | — | — | 2.4 |
| SL-8 | 98 | — | — | — | 5 | — | 0.1 |

TABLE 1-continued

| | Poly-propylene-based resin | Compatible elastomer | Ethylene-meth-acrylate copolymer | Oleic acid | Ethylene-ethyl acrylate-maleic anhydride copolymer | Ethylene-ethyl-acrylate copolymer | Concentration of anionic functional group in resin composition (mass %) |
|---|---|---|---|---|---|---|---|
| SL-9 | 50 | — | — | — | 50 | — | 1.1 |
| SL-10 | 50 | — | — | — | — | 50 | —(1*) |

1*The functional group (—COOC$_2$H$_5$) concentration in the resin composition is 7.3 mass %.

Example A1

First, the first and second corrosion prevention treatment layers were provided on the metal foil layer by the following procedure. Namely, (CL-1) was applied on both sides of the metal foil layer by micro gravure coating so that the dry coating amount was 70 mg/m$^2$, and subjected to a baking treatment at 200° C. in a drying unit. Next, by coating (CL-2) on the obtained layer by microgravure coating so that the dry coating amount was 20 mg/m$^2$, a compound layer composed of (CL-1) and (CL-2) was formed as the first and second corrosion prevention treatment layers. The compound layer was made to express a corrosion prevention performance by compounding the two types of (CL-1) and (CL-2).

Next, the first corrosion prevention treatment layer side of the metal foil layer provided with the first and second corrosion prevention treatment layer was bonded to the substrate layer using the polyurethane-based adhesive (first adhesive layer) by dry laminating. The adhesive resin layer (thickness of 12 µm) and the sealant layer (thickness of 25 µm) were laminated in this order by setting the substrate layer bonded with the aluminum foil layer in the unwinding unit of an extrusion laminator, and coextruding on the second corrosion prevention treatment layer at the processing conditions of 290° C. and 100 m/minute. Note that, regarding the adhesive resin layer and the sealant layer, the compounds of the various materials were prepared in advance using a twin-screw extruder, and were used in the aforementioned extrusion laminate after having been prepared by going through water cooling and pelletization steps. Resin composition (SL-4) was used in the formation of the sealant layer.

The laminate thus obtained was subjected to a heat treatment by thermal lamination so that the maximum attainable temperature of the laminate was 190° C., thereby producing the exterior material (the laminate of the substrate layer/the first adhesive layer/the first corrosion prevention treatment layer/the metal foil layer/the second corrosion prevention treatment layer/the adhesive resin layer/the sealant layer) of Example A1.

Examples A2 to A5

The exterior materials of Examples A2 to A5 were manufactured in the same manner as Example A1 except that the resin compositions used in the formation of the sealant layer were respectively changed to (SL-5), (SL-6), (SL-7) and (SL-9) (each having a thickness of 25 µm).

Example A6

The exterior material of Example A6 was manufactured in the same manner as Example A1 except for using (SL-1) and (SL-4) as the resin compositions used in the formation of the sealant layer, and laminating in the sequence of the adhesive resin layer (thickness of 10 µm) and a sealant layer having a two layer configuration of the sealant layer of the (SL-4) layer (thickness of 15 µm) and the (SL-1) layer (thickness of 10 µm) by performing three-layer extrusion with an extrusion laminator.

Example A7

The exterior material of Example A7 was manufactured in the same manner as Example A1 except for using (SL-2) and (SL-4) as the resin compositions in the formation of the sealant layer, and laminating in the sequence of the adhesive resin layer (thickness of 12 µm) and a sealant layer having a two layer configuration of the (SL-4) layer (thickness of 15 µm) and the (SL-2) layer (thickness of 10 µm) by performing three-layer extrusion with an extrusion laminator.

Example A8

The exterior material of Example A8 was manufactured in the same manner as Example A7 except that the second adhesive layer was formed in place of the adhesive resin layer.

Example A9

The exterior material of Example A9 was manufactured in the same manner as Example A7 except that the metal foil layer was provided with the first and second corrosion prevention treatment layers by the following procedure.

In Example A9, (CL-3) was applied on both sides of the metal foil layer by micro gravure coating so that the dry coating amount was 30 mg/m$^2$, and subjected to a baking treatment at 200° C. in a drying unit. Next, by coating (CL-2) on the obtained layer by microgravure coating so that the dry coating amount was 20 mg/m$^2$, a compound layer composed of (CL-3) and (CL-2) was formed as the first and second corrosion prevention treatment layers. The compound layer was made to express the corrosion prevention performance by compounding the two types of (CL-3) and (CL-2).

Example A10

The exterior material of Example A10 was manufactured in the same manner as Example A8 except that the metal foil layer was provided with the first and second corrosion prevention treatment layers by the same procedure as Example A9, and, the thickness of the (SL-4) layer was changed to 20 µm.

Example A11

The exterior material of Example A11 was manufactured in the same manner as Example A7 except that the thickness of the (SL-4) layer was changed to 20 µm.

Example A12

The exterior material of Example A12 was manufactured in the same manner as Example A6 except that the thickness of the (SL-4) layer was changed to 40 μm, and the thickness of the (SL-2) layer was changed to 20 μm.

Comparative Examples A1 to A5

The exterior materials of Comparative Examples A1 to A5 were manufactured in the same manner as Example 1 except that the resin compositions used in the formation of the sealant layer were respectively changed to (SL-1), (SL-2), (SL-3), (SL-8) and (SL-10) (each having a thickness of 25 μm).

<Evaluation>

The following evaluation tests were performed to the exterior materials obtained by Examples A1 to A12 and Comparative examples A1 to A5.

(Electrolytic Solution Laminate Strength)

An electrolytic solution prepared by adding 1M (1 mol/L) of $LiPF_6$ to a solution of ethylene carbonate/diethyl carbonate/dimethyl carbonate=1/1/1 was filled in a Teflon (registered trademark) container, a sample cut to 15 mm×100 mm was placed in the container, the container was sealed, and then stored at 85° C. for 24 hours. Then, after washing together, the strength of lamination (T-peel strength) between the metal foil layer/the adhesive resin layer or the metal foil layer/the second adhesive layer was measured using a testing machine (manufactured by INSTRON, Inc.). The testing was conducted in accordance with JISK 6854, under an atmosphere of 23° C. and 50% RH, and at a peeling rate of 50 mm/min. The strength of lamination was evaluated by the following criteria based on the results.

A: The laminate strength was in excess of than 9 N/15 mm

B: The laminate strength was 7 N/15 mm or more to 9 N/15 mm

C: The laminate strength was 5 N/15 mm or more to 7 N/15 mm

D: The laminate strength was less than 5 N/15 mm (Electrolytic Solution Heat Sealing Strength)

Figure 4:
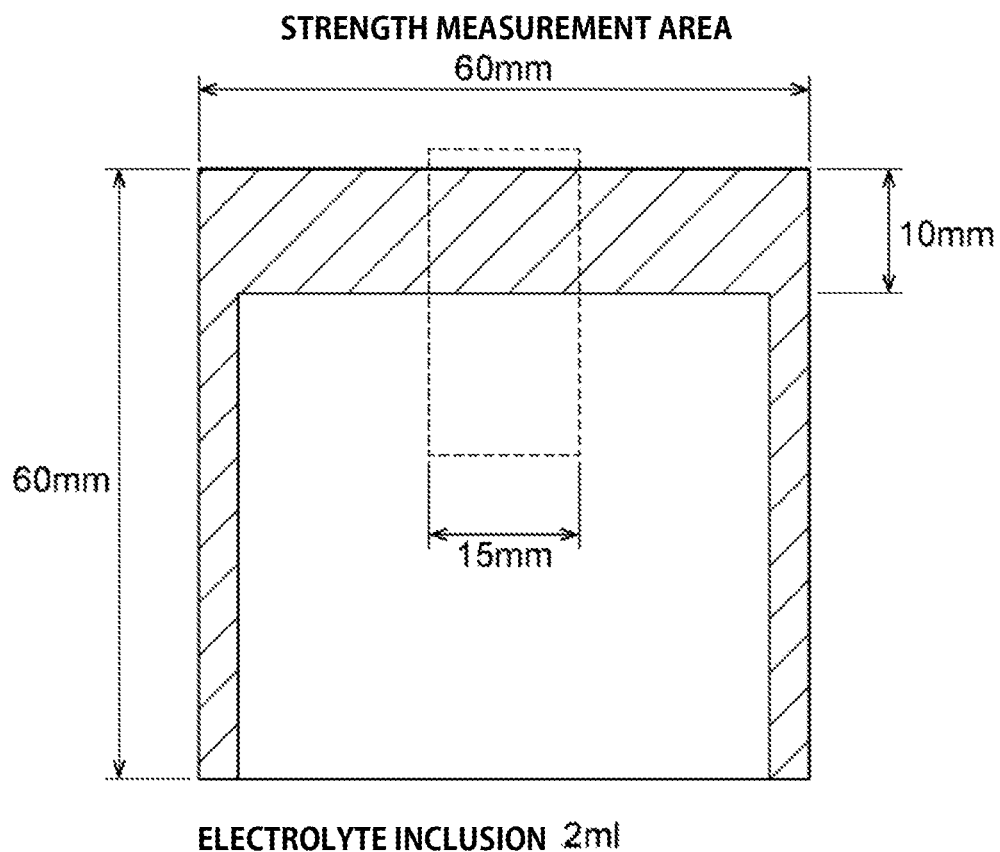
FIG. 4 is a schematic view explaining a method of manufacturing the evaluation samples in the Examples.

A sample of the exterior material cut to 60 mm×120 mm was folded in two, and one side was heat sealed with a 10 mm width seal bar at 190° C., 0.5 MPa for 3 sec. Then, after the two remaining sides were heat sealed, 2 ml of an electrolytic solution adjusted to 1 M of $LiPF_6$ in a mixed solution of ethylene carbonate/diethyl carbonate/dimethyl carbonate=1/1/1 (mass ratio) was poured in the bag-shaped exterior material, and the pouch was stored at 60° C. for 24 hours, the pouch was cut to a 15 mm width on the heat sealed side (refer to FIG. 4), and the sealing strength (T-peel strength) was measured using a testing machine (manufactured by INSTRON Inc. The testing was conducted in accordance with JISK 6854, under an atmosphere of 23° C. and 50% RH, and at a peeling rate of 50 mm/min. The sealing strength was evaluated by the following criteria based on the results.

A: The sealing strength was 80 N/15 mm or more, and the burst width was in excess of 5 mm B: The sealing strength was 80 N/15 mm or more, and the burst width was 3 to 5 mm C: The sealing strength was 60 N/15 mm or more to less than 80 N/15 mm D: The sealing strength was less than 60 N/15 mm (Degassing Heat Sealing Strength)

Figure 5C:
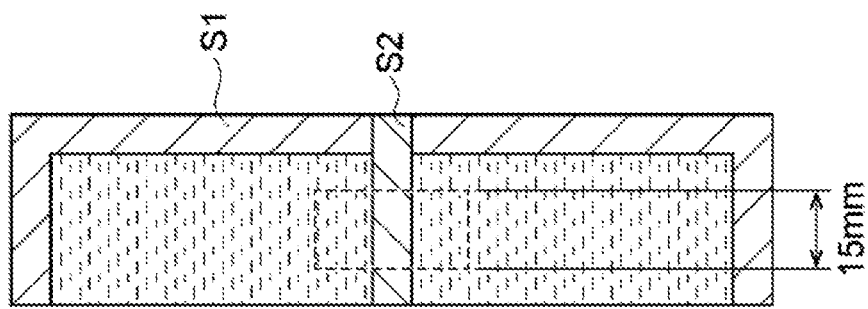
FIGS. 5(a) through 5(c) schematically depict steps in a method of manufacturing the evaluation samples in the Examples.
Figure 5B:
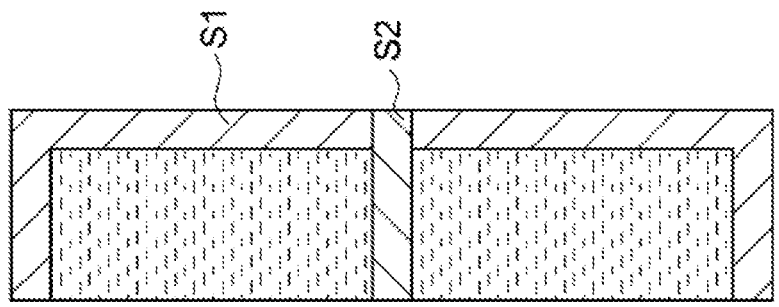
Figure 5A:
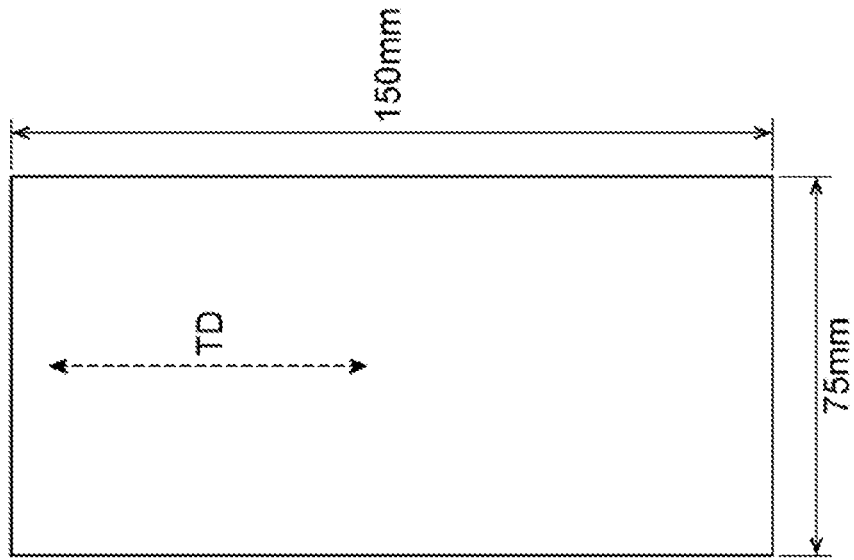

After a sample of the exterior material cut to 75 mm×150 mm was folded in two to a size of 37.5 mm×150 mm (refer to FIG. 5(a)), the 150 mm side was heat sealed with one of the two 37.5 mm sides and a bag was formed. Then, 5 ml of the electrolytic solution adjusted to 1 M of LiPF6 in a mixed solution of ethylene carbonate/diethyl carbonate/dimethyl carbonate=1/1/1 (mass ratio) was injected into the pouch, the other of the two 37.5 mm sides was heat sealed, and a pouch sealed by the seal part S1 was obtained. Then, after storing the sample at 60° C. for 24 hours, the center part of the pouch was heat sealed at 190° C., 0.3 MPa, for 2 sec in a state which included the electrolytic solution (refer to degassing seal part S2, FIG. 5(b)). After the sealed part was stabilized and stored at room temperature for 24 hours, the degassing seal part S2 was cut to a width of 15 m (refer to FIG. 5(c)), and the heat sealing strength (T-peel strength) was measured using a testing machine (manufactured by INSTRON Inc.). The testing was conducted in accordance with JISK 6854, under an atmosphere of 23° C. and 50% RH, and at a peeling rate of 50 mm/min. The heat sealing strength was evaluated by the following criteria based on the results.

A: The sealing strength was 60 N/15 mm or more

B: The sealing strength was 40 N/15 mm or more to less than 60 N/15 mm

C: The sealing strength was 30 N/15 mm or more to less than 40 N/15 mm

D: The sealing strength was less than 30 N/15 mm (Blushing After Molding)

The samples of the exterior material under normal conditions or at 60° C. for 1 week were cut to 120 mm×200 mm, and set on a die for cold forming so that the sealant layer was in contact with a projection of the forming machine, and deep drawing to 5 mm was performed at a forming speed of 10 mm/sec. Then, the sample was examined for blushing on the side positioned on the film-pressing portion side on which the orienting was the most severe. In the die, the forming area was 80 mm×70 mm (rectangular cylindrical shape) and the punch corner radius (RCP) was 1.0 mm. The blushing was evaluated by the following criteria based on the results. Note that, there are no practical problems if the evaluation is C or higher.

A: There was no blushing in samples under normal conditions and in samples after 1 week at 60° C.

B: There was no blushing in samples under normal conditions, and there was thin blushing in samples after 1 week at 60° C.

C: There was thin blushing in samples under normal conditions, and there was blushing in samples after 1 week at 60° C.

D: There was blushing in samples under normal conditions (Insulation Properties After Molding)

Figure 6A:
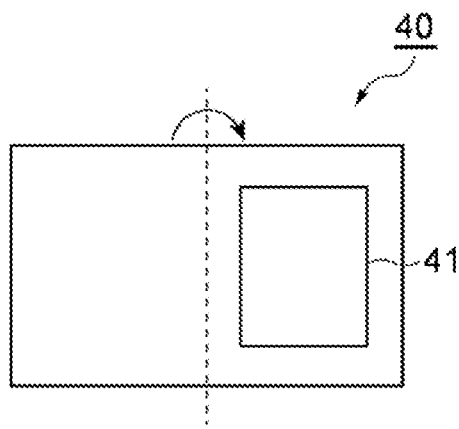
FIGS. 6(a) through 6(f) schematically depict steps in a method of manufacturing the evaluation samples in the Examples.
Figure 6B:
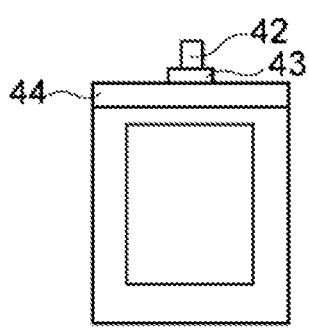
Figure 6C:
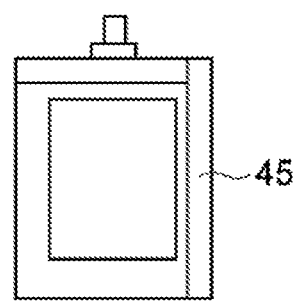
Figure 6D:
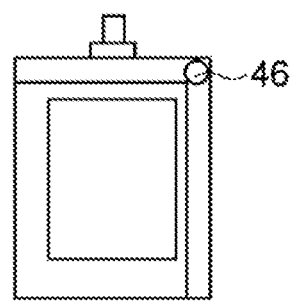

After a sample 40 of the exterior material was cut to 120 mm×200 mm, and set at a die for cold forming so that the sealant layer was in contact with a projection of the forming machine, deep drawing to 2.5 mm was performed at a forming speed of 15 mm/sec to form a deep drawing portion 41, and the sample was folded in two to a size of 120 mm×100 mm (refer to FIG. 6(a)). Then, after heat sealing a 100 mm upper edge portion 44 in a state sandwiched between a tab 42 and a tab sealant 43 (refer to FIG. 6(b)), a 120 mm side edge portion 45 was formed to a bag by heat sealing (refer to FIG. 6(c)). Then, a part of the outer layer of the sample 40 was cut to form an exposed portion 46 of the metal foil layer in order to be brought into contact with the electrode (refer to FIG. 6(d)). Then, 5 ml of the electrolytic solution adjusted to 1 M of $LiPF_6$ in a mixed solution of ethylene carbonate/diethyl carbonate/dimethyl carbonate=1/

Figure 6E:
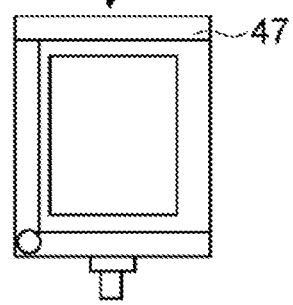
Figure 6F:
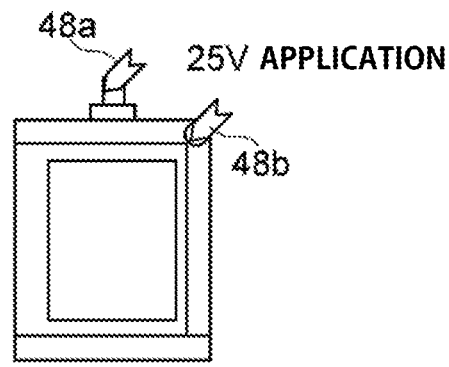

1/1 (mass ratio) was injected into the pouch, and a 100 mm lower edge portion 47 was sealed by heat sealing (refer to FIG. 6(e)). Then, electrodes 48a,48b were connected respectively to the tab 42 and the exposed portion 46 of the metal foil layer, a Withstand Voltage/Insulation Resistance Tester ("TOS9201" manufactured by Kikusui Electronic Corp.) was used to apply a voltage of 25V, and the resistance at this time was measured (refer to FIG. 6(f)). In the die, the forming area was 80 mm×70 mm (rectangular cylindrical shape) and the punch corner radius (RCP) was 1.0 mm. The resistance was evaluated by the following criteria based on the results.

A: The resistance value was in excess of 200 MΩ

B: The resistance value was 100 MΩ or more to 200 MΩ or less

C: The resistance value was 30 MΩ or more to less than 100 MΩ

D: The resistance value was less than 30 MΩ

(Overall Quality)

The results of each evaluation are shown in Table 2. In the following Table 2, the overall quality is excellent if the result of each evaluation has no D evaluation.

As is clear from the results shown in Table 2, it was confirmed that the exterior materials of Examples A1 to A12 having a layer in which the concentration of the anionic functional group is about 1.0 mass % or more as the sealant layer have excellent insulation properties after molding. Further, it was confirmed that the exterior materials of Examples A1 to A12 have sufficient performance in electrolytic solution laminate strength, electrolytic solution heat sealing strength, degassing heat sealing strength and blushing during molding.

The present invention will be further described based on the Examples.

[Materials Used]

The materials used in Examples B1 to B19 and Comparative examples B1 to B5 are as follows.

<Substrate Layer (thickness of 15 μm)>

Nylon film (Ny) (manufactured by Toyobo Co., Ltd.) was used.

<First Adhesive Layer (thickness of 4 μm)>

A polyurethane-based adhesive (manufactured by Toyo Ink Co., Ltd.) incorporating a tolylene diisocyanate adduct-based curing agent in the polyether polyol-based main agent was used.

<First Corrosion Prevention Treatment Layer (substrate layer side)>

(CL-1): A "sodium polyphosphate-stabilized cerium oxide sol" adjusted to a solid concentration of 10 mass %

TABLE 2

| | Corrosion prevention treatment layer | Adhesive resin layer or second adhesive layer | Sealant layer | | | | Result | | | | |
|---|---|---|---|---|---|---|---|---|---|---|---|
| | | | AL side layer | | Innermost layer | | Electrolytic solution laminate strength | Electrolytic solution heat sealing strength | Degassing heat sealing strength | Blushing during molding | Insulation during molding |
| | | | Configuration | Thickness (μm) | Configuration | Thickness (μm) | | | | | |
| Ex. A1 | Ceria treatment | Adhesive resin layer | — | — | SL-4 | 25 | A | A | A | A | B |
| Ex. A2 | Ceria treatment | Adhesive resin layer | — | — | SL-5 | 25 | A | B | B | B | A |
| Ex. A3 | Ceria treatment | Adhesive resin layer | — | — | SL-6 | 25 | B | B | B | B | C |
| Ex. A4 | Ceria treatment | Adhesive resin layer | — | — | SL-7 | 25 | B | B | B | B | B |
| Ex. A5 | Ceria treatment | Adhesive resin layer | — | — | SL-9 | 25 | A | B | B | B | C |
| Ex. A6 | Ceria treatment | Adhesive resin layer | SL-4 | 15 | SL-1 | 10 | A | B | C | A | B |
| Ex. A7 | Ceria treatment | Adhesive resin layer | SL-4 | 15 | SL-2 | 10 | A | A | A | A | A |
| Ex. A8 | Ceria treatment | Second adhesive layer | SL-4 | 15 | SL-2 | 10 | A | A | A | A | A |
| Ex. A9 | Chemical conversion treatment | Adhesive resin layer | SL-4 | 15 | SL-2 | 10 | A | A | A | A | A |
| Ex. A10 | Chemical conversion treatment | Adhesive resin layer | SL-4 | 20 | SL-2 | 10 | A | A | A | A | A |
| Ex. A11 | Ceria treatment | Adhesive resin layer | SL-4 | 20 | SL-2 | 10 | A | A | A | A | A |
| Ex. A12 | Ceria treatment | Adhesive resin layer | SL-4 | 40 | SL-2 | 20 | A | A | A | A | A |
| Comp. Ex. A1 | Ceria treatment | Adhesive resin layer | — | — | SL-1 | 25 | A | C | D | A | D |
| Comp. Ex. A2 | Ceria treatment | Adhesive resin layer | — | — | SL-2 | 25 | A | B | B | A | D |
| Comp. Ex. A3 | Ceria treatment | Adhesive resin layer | — | — | SL-3 | 25 | A | B | B | A | D |
| Comp. Ex. A4 | Ceria treatment | Adhesive resin layer | — | — | SL-8 | 25 | A | A | A | A | D |
| Comp. Ex. A5 | Ceria treatment | Adhesive resin layer | — | — | SL-10 | 25 | B | B | B | B | D | using distilled water for the solvent was used. Note that, the sodium polyphosphate-stabilized cerium oxide sol was obtained by formulating 10 parts by mass of phosphate per 100 parts by mass of cerium oxide.

(CL-2): A composition comprising 90 mass % of "polyallylamine (manufactured by Nitto Boseki Co., Ltd)" and 10 mass % of "polyglycerol polyglycidyl ether (manufactured by Nagase Chemtex Corp.)" adjusted to a solid concentration of 5 mass % using distilled water was used for the solvent.

(CL-3): A chemical conversion treatment agent prepared by adding chromium fluoride (CrF3) to a water-soluble phenol resin (Sumitomo Bakelite Co., Ltd.) was adjusted to a solid concentration of 1 mass % using an aqueous phosphoric acid solution having a concentration of 1 mass % as the solvent, and the concentration was adjusted to 10 mg/m$^2$ as the amount of Cr present in the final dry coating was used.

<Metal Foil Layer (thickness of 35 μm)>

Annealed and degreased soft aluminum foil ("8079" manufactured by Toyo Aluminum K.K.) was used.

<Second Corrosion Prevention Treatment Layer (sealant layer side)>

(CL-1): A "sodium polyphosphate-stabilized cerium oxide sol" adjusted to a solid concentration of 10 mass % using distilled water for the solvent was used. Note that, the sodium polyphosphate-stabilized cerium oxide sol was obtained by formulating 10 parts by mass of phosphate per 100 parts by mass of cerium oxide.

(CL-2): A composition comprising 90 mass % of "polyallylamine (manufactured by Nitto Boseki Co., Ltd)" and 10 mass % of "polyglycerol polyglycidyl ether (manufactured by Nagase Chemtex Corp.)" adjusted to a solid concentration of 5 mass % using distilled water was used for the solvent.

(CL-3): A chemical conversion treatment agent prepared by adding chromium fluoride (CrF$_3$) to a water-soluble phenol resin (Sumitomo Bakelite Co., Ltd.) was adjusted to a solid concentration of 1 mass % using an aqueous phosphoric acid solution having a concentration of 1 mass % as the solvent, and the concentration was adjusted to 10 mg/m$^2$ as the amount of Cr present in the final dry coating was used.

<Adhesive Resin Layer>

The following materials were used.

(AR-1): An acid-modified polyethylene resin composition ("Admer" manufactured by Mitsui Chemicals Inc.) was used.

<Second Adhesive Layer (Thickness of 3 μm)>

An adhesive prepared by formulating 10 parts by mass (solid content ratio) of a polyisocyanate compound having an isocyanurate structure in 100 parts by mass of maleic anhydride-modified polyolefin resin dissolved in toluene was used.

<Sealant Layer>

The resin compositions (SL-11 to SL-26) in which each component shown in the following Table 3 was mixed at the formulation amounts (units: parts by mass) shown in the same table were used. Note that the details of each component are shown below.

L-LDPE1: A straight-chain low density polyethylene ("Umerit" manufactured by Ube-Maruzen Polyethylene, density 0.944 g/cm$^3$) obtained using a single site catalyst L-LDPE2: A straight-chain low density polyethylene ("Neo-Zex" manufactured by Prime Polymer Co., Ltd., density 0.945 g/cm$^3$) obtained using a multi-site catalyst LDPE: A low density polyethylene ("UBE polyethylene" manufactured by Ube-Maruzen Polyethylene, density 0.920 g/cm$^3$)

HDPE: A high density polyethylene ("Novatec HD" manufactured by Japan Polyethylene Corporation, density 0.960 g/cm$^3$)

Compatible elastomer: ethylene-α-olefin copolymer ("Tafiner-A" manufactured by Mitsui Chemicals Inc.) having a melting point of 66° C.

Ethylene-methacrylic acid copolymer: formulation ratio of 15 mass % methacrylic acid ("Nucrel" manufactured by Dupont) relative to the total amount of polymerization components Oleic acid: manufactured by NOF Corporation Ethylene-ethyl acrylate-maleic anhydride copolymer: formulation ratio of 3 mass % maleic anhydride (manufactured by Japan Polyethylene Corporation, "REXPEARL-ET") relative to the total amount of polymerization components Ethylene-ethyl acrylate copolymer: formulation ratio of 20 mass % ethyl acrylate ("REXPEARL-EEA" manufactured by Japan Polyethylene Corporation) relative to the total amount of polymerization components Note that, the concentration of the anionic functional group was calculated by the following procedure.

The concentration of the anionic functional group was obtained according to the following formula for SL-21 and 22.

$$\text{The concentration (mass \%) of the anionic functional group} = \{(\text{molecular weight of the carboxyl group})/(\text{molecular weight of oleic acid})\} \times (\text{content ratio (mass \%) of the oleic acid in the anionic functional group-containing layer})$$

The concentration of the anionic functional group was obtained according to the following formula for SL-13 to 20:

$$\text{The concentration (mass \%) of the anionic functional group} = [\{(\text{molecular weight of the carboxyl group})/(\text{molecular weight of the methacrylic acid})\} \times (\text{content ratio (mass \%) of the methacrylic acid in the copolymer})] \times (\text{content ratio (mass \%) of the copolymer in the anionic functional group-containing layer})$$

The concentration of the anionic functional group was obtained according to the following formula for SL-23 and 24:

$$\text{The concentration (mass \%) of the anionic functional group} = [\{(\text{molecular weight of the acid anhydride group } (-CO-O-CO-))/(\text{molecular weight of maleic anhydride})\} \times (\text{the content ratio (mass \%) of maleic anhydride in the copolymer})] \times (\text{content ratio (mass \%) of the copolymer in the anionic functional group-containing layer})$$

TABLE 3

| | Polyethylene-based resin | | Compatible elastomer | Ethylene-methacrylic acid copolymer | Oleic acid | Ethylene ethyl acrylate-maleic anhydride copolymer | Ethylene-ethyl acrylate copolymer | Density (mass %) of anionic functional group in resin composition |
|---|---|---|---|---|---|---|---|---|
| | Type | Formulation amounts | | | | | | |
| SL-11 | L-LDPE1 | 100 | 0 | — | — | — | — | 0.0 |
| SL-12 | L-LDPE1 | 65 | 35 | — | — | — | — | 0.0 |
| SL-13 | L-LDPE1 | 97 | — | 3 | — | — | — | 0.2 |
| SL-14 | L-LDPE1 | 75 | — | 25 | — | — | — | 2.0 |
| SL-15 | L-LDPE1 | 50 | — | 50 | — | — | — | 3.9 |
| SL-16 | L-LDPE1 | 25 | — | 75 | — | — | — | 5.9 |
| SL-17 | — | 0 | — | 100 | — | — | — | 7.8 |
| SL-18 | L-LDPE2 | 50 | — | 50 | — | — | — | 3.9 |
| SL-19 | LDPE | 50 | — | 50 | — | — | — | 3.9 |
| SL-20 | HDPE | 50 | — | 50 | — | — | — | 3.9 |
| SL-21 | L-LDPE1 | 85 | — | — | 15 | — | — | 2.4 |
| SL-22 | L-LDPE1 | 70 | — | — | 30 | — | — | 4.8 |
| SL-23 | L-LDPE1 | 20 | — | — | — | 80 | — | 1.8 |
| SL-24 | — | 0 | — | — | — | 100 | — | 2.2 |
| SL-25 | L-LDPE1 | 50 | — | — | — | — | 50 | —(*1) |
| SL-26 | L-LDPE1 | 20 | — | — | — | — | 80 | —(*2) |

*1: The density of the functional group (—$COOC_2H_5$) in the resin composition was 7.3 mass %.
*2: The density of the functional group (—$COOC_2H_5$) in the resin composition was 11.7 mass %.

Example B1

First, the first and second corrosion prevention treatment layers were provided on the metal foil layer by the following procedure. Namely, (CL-1) was applied on both sides of the metal foil layer by micro gravure coating so that the dry coating amount was 70 mg/m$^2$, and subjected to a baking treatment at 200° C. in a drying unit. Next, by coating (CL-2) on the obtained layer by microgravure coating so that the dry coating amount was 20 mg/m$^2$, a compound layer composed of (CL-1) and (CL-2) was formed as the first and second corrosion prevention treatment layers. The compound layer was made to express the corrosion prevention performance by compounding the two types of (CL-1) and (CL-2).

Next, the first corrosion prevention treatment layer side of the metal foil layer provided with the first and second corrosion prevention treatment layer was bonded to the substrate layer using the polyurethane-based adhesive (first adhesive layer) by dry laminating. The adhesive resin layer (thickness of 12 μm), the sealant layer (thickness of 23.3 μm) were laminated in the this order by setting the substrate layer bonded with the aluminum foil layer in the unwinding unit of an extrusion laminator, and coextruding on the second corrosion prevention treatment layer at processing conditions of 290° C. and 100 m/minute. Note that, regarding the adhesive resin layer and the sealant layer, the compounds of the various materials were prepared in advance using a twin-screw extruder, and were used in the aforementioned extrusion laminate after having been prepared by going through water cooling and pelletization steps. The resin composition (SL-14) was used for the formation of the sealant layer.

The laminate thus obtained was subjected to a heat treatment by thermal lamination so that the maximum attainable temperature of the laminate was 190° C., thereby producing the exterior material (the laminate of the substrate layer/the first adhesive layer/the first corrosion prevention treatment layer/the metal foil layer/the second corrosion prevention treatment layer/the adhesive resin layer/the sealant layer) of Example B1.

Examples B2 to B11

The exterior materials of Examples B2 to B11 were manufactured in the same manner as Example B1 except that the resin compositions used in the formation of the sealant layer were respectively changed to (SL-15), (SL-16), (SL-17), (SL-18), (SL-19), (SL-20), (SL-21), (SL-22), (SL-23) and (SL-24) (each having a thickness of 23.3 μm).

Example B12

The exterior material of Example B12 was manufactured in the same manner as Example B1 except for using (SL-11) and (SL-16) as the resin compositions used in the formation of the sealant layer, and laminating in the sequence of the adhesive resin layer (thickness of 12 μm) and the sealant layer having a two layer configuration of the (SL-16) layer (thickness of 11.7 μm) and the (SL-11) layer (thickness of 11.6 μm) by performing three-layer extrusion with an extrusion laminator.

Example B13

The exterior material of Example B13 was manufactured in the same manner as Example B1 except for using (SL-12) and (SL-16) as the resin compositions used in the formation of the sealant layer, and laminating in the sequence of the adhesive resin layer (thickness of 12 μm) and the sealant layer having a two layer configuration of the (SL-16) layer (thickness of 11.7 μm) and the (SL-12) layer (thickness of 11.6 μm) by performing three-layer extrusion with an extrusion laminator.

Example B14

The exterior material of Example B14 was manufactured in the same manner as Example B1 except for forming the second adhesive layer in place of the adhesive resin layer, and, forming a sealant layer having a two layer configuration of the (SL-16) layer (thickness of 17.5 μm) and the (SL-12) layer (thickness of 17.5 μm) by coextrusion in advance, and laminating so that the (SL-16) layer is laminated on the second adhesive layer side by dry lamination.

Example B15

The exterior material of Example B15 was manufactured in the same manner as Example B13 except that the resin composition used in the formation of the layer of the metal foil layer side of the sealant layer was changed to SL-17 (thickness of 11.7 μm).

Example B16

The exterior material of Example B16 was manufactured in the same manner as Example B13 except that the first and second corrosion prevention treatment layers were provided in the metal foil layer by the following procedure.

In Example B16, (CL-3) was applied on both sides of the metal foil layer by micro gravure coating so that the dry coating amount was 30 mg/m², and subjected to a baking treatment at 200° C. in a drying unit. Next, by coating (CL-2) on the obtained layer by microgravure coating so that the dry coating amount was 20 mg/m², a compound layer composed of (CL-3) and (CL-2) was formed as the first and second corrosion prevention treatment layers. The compound layer was made to express the corrosion prevention performance by compounding the two types of (CL-3) and (CL-2).

Example B17

The exterior material of Example B17 was produced in the same manner as Example B14 except that the first and second corrosion prevention treatment layers were provided in the metal foil layer by the same procedure as Example B16.

Example B18

The exterior material of Example B18 was manufactured in the same manner as Example B1 except for using (SL-12) and (SL-16) as the resin compositions used in the formation of the sealant layer, and laminating in the sequence of the adhesive resin layer (thickness of 12 μm) and the sealant layer having a two layer configuration of the (SL-16) layer (thickness of 15.0 μm) and the (SL-12) layer (thickness of 15.0 μm) by performing three-layer extrusion with an extrusion laminator.

Example B19

The exterior material of Example B19 was manufactured in the same manner as Example B1 except for using (SL-12) and (SL-16) as the resin compositions used in the formation of the sealant layer, and laminating in the sequence of the adhesive resin layer (thickness of 12 μm) and the sealant layer having a two layer configuration of the (SL-16) layer (thickness of 30.0 μm) and the (SL-12) layer (thickness of 30.0 μm) by performing three-layer extrusion with an extrusion laminator.

Comparative Examples B1 to B5

The exterior materials of Comparative Examples B1 to B5 were manufactured in the same manner as Example B1 except that the resin compositions used in the formation of the sealant layers were changed to (SL-11), (SL-12), (SL-13), (SL-25) and (SL-26) (each having a thickness of 23.3 μm).

<Evaluation>

Evaluation tests were performed on the exterior materials obtained by Examples B1 to B19 and Comparative Examples B1 to B5 in the same manner as the aforementioned Examples A1 to A12 and Comparative Examples A1 to A5.

(Overall Quality)

The results of each of the aforementioned evaluations are shown in Tables 4 and 5. In the following Tables 4 and 5, the overall quality is excellent if the result of each evaluation has no D evaluation.

TABLE 4

| | | Adhesive resin layer or second adhesive layer | Sealant layer | | | | Results | | | | |
|---|---|---|---|---|---|---|---|---|---|---|---|
| | Corrosion prevention treatment layer | | AL side layer | | Innermost layer | | Electrolytic solution laminate strength | Electrolytic solution heat sealing strength | Degassing heat sealing strength | Blushing during molding | Insulation during molding |
| | | | Configuration | Thickness (μm) | Configuration | Thickness (μm) | | | | | |
| Ex. B1 | Ceria treatment | Adhesive resin layer | — | — | SL-14 | 23.3 | A | A | A | B | B |
| Ex. B2 | Ceria treatment | Adhesive resin layer | — | — | SL-15 | 23.3 | A | A | A | B | A |
| Ex. B3 | Ceria treatment | Adhesive resin layer | — | — | SL-16 | 23.3 | A | B | B | B | A |
| Ex. B4 | Ceria treatment | Adhesive resin layer | — | — | SL-17 | 23.3 | A | B | C | B | A |
| Ex. B5 | Ceria treatment | Adhesive resin layer | — | — | SL-18 | 23.3 | A | B | B | C | A |
| Ex. B6 | Ceria treatment | Adhesive resin layer | — | — | SL-19 | 23.3 | A | A | C | A | A |

TABLE 4-continued

|  | Corrosion prevention treatment layer | Adhesive resin layer or second adhesive layer | Sealant layer | | | | Results | | | | |
|---|---|---|---|---|---|---|---|---|---|---|---|
|  |  |  | AL side layer | | Innermost layer | | Electro-lytic solution laminate strength | Electrolytic solution heat sealing strength | Degassing heat sealing strength | Blushing during molding | Insulation during molding |
|  |  |  | Configuration | Thickness (μm) | Configuration | Thickness (μm) |  |  |  |  |  |
| Ex. B7 | Ceria treatment | Adhesive resin layer | — | — | 5L-20 | 23.3 | A | C | B | C | A |
| Ex. B8 | Ceria treatment | Adhesive resin layer | — | — | SL-21 | 23.3 | B | B | B | B | B |
| Ex. B9 | Ceria treatment | Adhesive resin layer | — | — | SL-22 | 23.3 | C | C | C | C | B |
| Ex. B10 | Ceria treatment | Adhesive resin layer | — | — | SL-23 | 23.3 | A | A | C | B | C |
| Ex. B11 | Ceria treatment | Adhesive resin layer | — | — | SL-24 | 23.3 | A | A | C | B | B |
| Ex. B12 | Ceria treatment | Adhesive resin layer | SL-16 | 11.7 | SL-11 | 11.6 | A | B | B | C | A |
| Ex. B13 | Ceria treatment | Adhesive resin layer | SL-16 | 11.7 | SL-12 | 11.6 | A | A | A | A | A |
| Ex. B14 | Ceria treatment | Second adhesive layer | SL-16 | 17.5 | SL-12 | 17.5 | B | A | A | A | A |
| Ex. B15 | Ceria treatment | Adhesive resin layer | SL-17 | 11.7 | SL-12 | 11.6 | A | A | B | A | A |

TABLE 5

|  | Corrosion prevention treatment layer | Adhesive resin layer or second adhesive layer | Sealant layer | | | | Results | | | | |
|---|---|---|---|---|---|---|---|---|---|---|---|
|  |  |  | AL side layer | | Innermost layer | | Electro-lytic solution laminate strength | Electrolytic solution heat sealing strength | De-gassing heat sealing strength | Blushing during molding | Insulation during molding |
|  |  |  | Configuration | Thickness (μm) | Configuration | Thickness (μm) |  |  |  |  |  |
| Ex. B16 | Chemical conversion treatment | Adhesive resin layer | SL-16 | 11.7 | SL-12 | 11.6 | A | A | A | B | B |
| Ex. B17 | Chemical conversion treatment | Second adhesive layer | SL-16 | 17.5 | SL-12 | 17.5 | B | A | A | A | A |
| Ex. B18 | Ceria treatment | Adhesive resin layer | SL-16 | 15.0 | SL-12 | 15.0 | A | A | A | A | A |
| Ex. B19 | Ceria treatment | Adhesive resin layer | SL-16 | 30.0 | SL-12 | 30.0 | A | A | B | B | B |
| Comp. E. B1 | Ceria treatment | Adhesive resin layer | — | — | SL-11 | 23.3 | A | A | B | B | D |
| Comp. E. B2 | Ceria treatment | Adhesive resin layer | — | — | SL-12 | 23.3 | A | A | A | A | D |
| Comp. E. B3 | Ceria treatment | Adhesive resin layer | — | — | SL-13 | 23.3 | A | A | B | B | D |
| Comp. E. B4 | Ceria treatment | Adhesive resin layer | — | — | SL-25 | 23.3 | A | A | B | B | D |

TABLE 5-continued

| | Corrosion prevention treatment layer | Adhesive resin layer or second adhesive layer | Sealant layer | | | | Results | | | | |
| --- | --- | --- | --- | --- | --- | --- | --- | --- | --- | --- | --- |
| | | | AL side layer | | Innermost layer | | Electrolytic solution laminate strength | Electrolytic solution heat sealing strength | Degassing heat sealing strength | Blushing during molding | Insulation during molding |
| | | | Configuration | Thickness (μm) | Configuration | Thickness (μm) | | | | | |
| Comp. E. B5 | Ceria treatment | Adhesive resin layer | — | — | SL-26 | 23.3 | B | C | C | B | D |

As is clear from the results shown in Tables 4 and 5, it was verified that the exterior material of Examples B1 to B19 having the layer in which the concentration of the anionic functional group is about 1.0 mass % or more has excellent insulation properties after molding as the sealant layer. Further, it was verified that the exterior material of Examples B1 to B19 have sufficient performance in electrolytic solution laminate strength, electrolytic solution heat sealing strength, degassing heat sealing strength and reduction of blushing during molding.

REFERENCE SIGNS LIST 10,20,30 . . . exterior material for a lithium ion battery, 11 . . . substrate layer, 12 . . . first adhesive layer, 13 . . . metal foil layer, 14 . . . corrosion prevention treatment layer, 15 . . . adhesive resin layer, 16 . . . sealant layer (anionic functional group-containing layer), 16a . . . first sealant layer, 16b . . . second sealant layer, 17 . . . second adhesive layer, 40 . . . sample, 41 . . . deep drawing portion, 42 . . . tab, 43 . . . tab sealant, 44 . . . upper edge portion, 45 . . . side edge portion, 46 . . . exposed portion of metal foil layer, 47 . . . lower edge portion, 48a,48b . . . electrode, S1 . . . seal part, S2 . . . degassing seal part.

What is claimed is:

1. An exterior material for a lithium ion battery consisting of in that order:
   a substrate layer;
   a first adhesive layer
   a first corrosion prevention layer;
   a metal foil layer;
   a second corrosion prevention layer;
   an adhesive resin layer; and
   a sealant bilayer consisting of (a) a metal foil side layer, which faces the metal foil side layer and (b) an innermost layer, which faces away from the metal foil layer;
   wherein the metal foil side layer of the sealant bilayer comprises of a propylene-ethylene random copolymer and of ethylene-methacrylate copolymer, wherein a mass concentration of the carboxylic group in the metal foil side layer is 1.0 mass % or more; and the innermost layer of the sealant bilayer consists of a propylene-ethylene random copolymer and a propylene-butene-1 random copolymer elastomer,
   wherein the adhesive resin layer consists of (AR-I) an acid modified polypropylene resin composition of a random polypropylene formulated with an ethylene-propylene rubber; (AR-2) a polypropylene having an atactic structure or a propylene-a-olefin copolymer having an atactic structure; and (AR-3) a propylene-a-olefin copolymer having an isotactic structure.

2. The exterior material of claim 1, wherein a mass ratio between AR-1, AR-2 and AR-3 is 3:1:1.

3. The exterior material of claim 1, wherein a total thickness of the adhesive resin layer and the sealant bilayer is 60 μm or less and 37 μm or more.

4. The exterior material of claim 1, wherein a total thickness of the adhesive resin layer and the sealant bilayer is 42 μm or less and 37 μm or more.

5. The exterior material of claim 1, wherein each of the first corrosion prevention layer and the second corrosion prevention layer comprises with sol of cerium oxide.

6. The exterior material of claim 1, wherein each of the first corrosion prevention layer and the second corrosion prevention layer is a bilayer consisting of a first layer comprising a sodium polyphosphate-stabilized cerium oxide sol obtained by formulating 10 parts by mass of phosphate per 100 parts by mass cerium oxide wherein the solid concentration is 10% by mass in water and a second layer comprising 90% polyallylamine and 10% polyglycerol polyglycidyl ether.

7. The exterior material of claim 1, wherein each of the first corrosion prevention layer and the second corrosion prevention layer is a bilayer consisting of a first layer comprising a chemical conversion treatment agent prepared by adding chromium fluoride to a water-soluble phenol resin adjusted to a solid concentration of 1 mass % using an aqueous phosphoric acid solution having a concentration of 1 mass % as the solvent wherein the concentration was adjusted to 10 mg/m2 as the amount of Cr present in the final dry coating and a second layer comprising 90% polyallylamine and 10% polyglycerol polyglycidyl ether.

8. The exterior material of claim 1, wherein the mass concentration of the carboxylic group in the metal foil side layer of the sealant bilayer is 2.0%.

9. The exterior material of claim 1, wherein a thickness of the sealant bilayer is 30 μm or less.

10. The exterior material of claim 1, wherein the metal foil layer is an aluminum layer.

11. The exterior material of claim 1, wherein the metal foil side layer of the sealant bilayer comprises 65 mass % of the propylene-ethylene random copolymer and 25 mass % of the ethylene-methacrylate copolymer and the innermost later of the sealant bilayer consists of 80 mass % of the propylene-ethylene random copolymer and 20 mass % of the propylene-butene-1 random copolymer elastomer.

* * * * *